US007962432B2

(12) United States Patent
Timmins et al.

(10) Patent No.: US 7,962,432 B2
(45) Date of Patent: Jun. 14, 2011

(54) ANALYZING INFORMATION TECHNOLOGY SYSTEMS USING COLLABORATIVE INTELLIGENCE DATA ANONIMITY

(75) Inventors: Paul J. Timmins, Natick, MA (US); Mark Kincaid, Cumberland, RI (US)

(73) Assignee: Timmins Software Corporation, Natick, MA (US)

( * ) Notice: Subject to any disclaimer, the term of this patent is extended or adjusted under 35 U.S.C. 154(b) by 588 days.

(21) Appl. No.: 11/971,684

(22) Filed: Jan. 9, 2008
(Under 37 CFR 1.47)

(65) Prior Publication Data
US 2008/0301076 A1      Dec. 4, 2008

Related U.S. Application Data

(60) Provisional application No. 60/885,080, filed on Jan. 16, 2007.

(51) Int. Cl.
*G06F 17/00* (2006.01)
*G06N 5/02* (2006.01)

(52) U.S. Cl. .............................. 706/46; 705/37; 715/745

(58) Field of Classification Search ................... 706/46; 705/7; 715/745
See application file for complete search history.

(56) References Cited

U.S. PATENT DOCUMENTS

| 5,734,890 A | 3/1998 | Case et al. | 395/605 |
| 6,708,188 B1 | 3/2004 | Bear et al. | 707/202 |
| 6,990,520 B2 | 1/2006 | Green et al. | 709/223 |
| 7,016,810 B2 | 3/2006 | Stanley | 702/186 |
| 7,024,381 B1 | 4/2006 | Hastings et al. | 705/26 |
| 7,031,957 B2 | 4/2006 | Harris | 707/3 |

(Continued)

FOREIGN PATENT DOCUMENTS
KR    10-2006-0004904 A    1/2006
(Continued)

OTHER PUBLICATIONS

*My Game Advisor Screen Shots*, Futuremark.com,, Nov. 6, 2006, 12 pages.
IBM, *Netcool + Tivoli: Delivering service management innovation*, Aug. 2006, 28 pages.

(Continued)

*Primary Examiner* — Jeffrey A Gaffin
*Assistant Examiner* — Kalpana Bharadwaj
(74) *Attorney, Agent, or Firm* — Sunstein Kann Murphy & Timbers LLP

(57) ABSTRACT

An information technology (IT) system of interest is analyzed using collaborative, community-based sharing of expert knowledge, analysis and advice through user-submitted analysis rules and/or user-submitted report templates. Users may submit rules that have been found to be useful in analyzing or managing IT systems. A rule may analyze a particular item of configuration data or performance data according to a predetermined criterion. Other users may apply these rules to their own systems' data and, thereby, utilize the collective expertise of the people who submitted the rules. Performance and configuration data from IT systems or components of the systems in various enterprises is collected and then sanitized by removing or masking identifying information before storing the sanitized data in a data warehouse. An IT manager may compare data from his/her IT system to historical data from the system or to data from IT systems having similar workloads, configurations, problems or according to other matching criteria, without obtaining confidential information about the comparison systems. Such comparisons may use the user-submitted rules. Reports are generated from these analyses and comparisons according to predefined and/or user-submitted report templates and report component templates for items such as text blocks, tables, graphs, charts and block diagrams.

53 Claims, 20 Drawing Sheets

U.S. PATENT DOCUMENTS

| | | | | |
|---|---|---|---|---|
| 7,069,308 | B2 | 6/2006 | Abrams | 709/218 |
| 7,110,997 | B1 | 9/2006 | Turkel et al. | 707/3 |
| 7,113,917 | B2 | 9/2006 | Jacobi et al. | 705/14 |
| 7,117,185 | B1 | 10/2006 | Aliferis et al. | 706/12 |
| 7,117,215 | B1 | 10/2006 | Kanchwalla et al. | 707/100 |
| 7,117,254 | B2 | 10/2006 | Lunt et al. | 709/218 |
| 7,120,559 | B1 | 10/2006 | Williams et al. | 702/185 |
| 7,124,101 | B1 | 10/2006 | Mikurak | 705/35 |
| 7,124,121 | B1 | 10/2006 | Drescher | 706/12 |
| 7,124,144 | B2 | 10/2006 | Christianson et al. | 707/102 |
| 7,124,302 | B2 | 10/2006 | Ginter et al. | 713/189 |
| 7,124,438 | B2 | 10/2006 | Judge et al. | 726/22 |
| 7,127,440 | B2 | 10/2006 | Jeanblanc et al. | 706/45 |
| 7,127,501 | B1 | 10/2006 | Beir et al. | 709/219 |
| 7,130,844 | B2 | 10/2006 | Elder et al. | 707/3 |
| 7,130,880 | B1 | 10/2006 | Burton et al. | 709/203 |
| 7,188,153 | B2 | 3/2007 | Lunt et al. | 709/218 |
| 2002/0083170 | A1 | 6/2002 | Collazo | 709/224 |
| 2005/0172093 | A1 | 8/2005 | Jain | 711/162 |
| 2006/0229931 | A1 | 10/2006 | Fligler et al. | 705/10 |
| 2006/0235811 | A1 | 10/2006 | Fairweather | 706/12 |
| 2006/0235875 | A1 | 10/2006 | Wen et al. | 707/103 |
| 2007/0081197 | A1 | 4/2007 | Omoigui | 358/403 |
| 2007/0276710 | A1* | 11/2007 | Hudgeon et al. | 705/7 |
| 2008/0021917 | A1* | 1/2008 | Baker et al. | 707/102 |
| 2009/0012878 | A1* | 1/2009 | Tedesco et al. | 705/27 |

FOREIGN PATENT DOCUMENTS

| KR | 10-2006-0006682B A | 1/2006 |
|---|---|---|

OTHER PUBLICATIONS

*Netcool Suite* screen shot, Prior to Jan. 16, 2007, 1 page.

Wikipedia.org, *Friendster*, Jan. 10, 2007, 2 pages.

Polat, et al., "*Privacy-Preserving Collaborative Filtering Using Randomized Perturbation Techniques*," Proceedings of the Third IEEE International Conference on Data Mining, Apr. 3, 1978, 4 pages.

Canny, J., "*Collaborative Filtering with Privacy via Factor Analysis*," Proceedings of the 25th Annual International ACM SIGIR conference on Research and Development in Information Retrieval, pp. 238-245, Aug. 11-15, 2002.

"*Tivoli Netcool for Service Providers*", 3 pages, Jan. 8, 2007.

ebay, "*Turbo Lister Listing Activity Quick Start Guide*," Version 1.1, 8 pages, Jan. 2007.

ebay.com, "*Turbo Lister*," 1 page, Jan. 12, 2007.

European Patent Office; Authorized Officer: Gardiner, A. *Extended European Search Report*, International Application No. PCT/EP2008/050617, mailed Jan. 3, 2011, 7 pages.

Authorized Officer Commissioner PCT/US2008/050617, Notification of Transmittal of the International Search Report and the Written Opinion of the International Searching Authority and the Written Opinion of the International Searching Authority, Mar. 31, 2009, 4 pages.

Authorized Officer So Young Doo PCT/US2008/050617, International Search Report, Mar. 31, 2009, 3 pages.

Authorized Officer So Young Doo PCT/US2008/050617, Written Opinion of the International Searching Authority, Mar. 31, 2009, 4 pages.

* cited by examiner

Rule Entry Form

| | | |
|---|---|---|
| Rule name | Processor Overloaded | ~600 |

602 ○ Copy existing rule  [_____▼] ~604
606 ● Start from scratch

Data item  [CPU Utilization ▼] ~608

Condition to trigger rule  [Greater than ▼] ~610

[_____▼] ~612

614 ○ Data item
616 ● Absolute value    [Advanced] ~618

630 — [Save Rule]

Consequence
620 — Processor <<host>> overloaded for interactive workload. Consider reducing load, distributing some load to another host or upgrading the processor.

632 — [Delete Rule]

634 — [Cancel]

624
☒ Recommended Change:

Data Item  [Exchange Server Version No. ▼] ~626

Recommended valve  [2003  SP2 ▼] ~628

*FIG. 6*

Report Component Template
(Table)

Backup Servers

| Server Name | Backup Software (Vendor) | Software Version Number | Number of Clients |
|---|---|---|---|
| <<Srvr>> | <<BU_SW>> | <<Ver No>> | <<Clients>> |
| | | | |

Per-Client Statistics

| Host | Week of | No. Jobs | Failed Jobs | Success Jobs | Duration | No. Files |
|---|---|---|---|---|---|---|
| <<Host>> | <<Wk>> | <<Jobs>> | <<FJobs>> | <<SJobs>> | <<Durat>> | <<Files>> |
| | | | | | | |

*FIG. 10*

Creating a Table Component

New Component      1   2   3

Select the columns you want to display in the table

Available Columns:

| Category 1 | Active Jobs by Hour |
| Category 2 | All Backup Jobs |
| Category 3 | All Restore Jobs |
| | Backup Client List |
| | Backup Client Stats |
| | Backup Client Summary |
| | Backup Client Weekly Averages |

Add →
← Remove

Selected Columns:

1900

Filter by:

| Text Field | ∨ | is | ∨ |
| Numeric Field | ∨ | is greater than | ∨ |
| Date Field | ∨ | is before | ∨ |

Sort by:

| — Sort Order 1 — | ∨ |
| — Sort Order 2 — | ∨ |
| — Sort Order 3 — | ∨ |

1902

[Back] [Next] [Finish] [Cancel]

*FIG. 19*

Creating a Chart Component

New Component | 1 | 2 | 3 |

Select the data you want to display on the chart.

2D Chart: All Backup Job

Name: [                    ]

**\* X Axis**

Column: [ capacity kb  ▾ ]   \* Datatype: [     ▾ ]
Label:  [              ]

Z Axis

Column: [              ▾ ]   \* Datatype: [     ▾ ]
Label:  [              ]

**\* Value Axis**

Column: [ capacity kb  ▾ ]
Label:  [              ]

Render as:  [ Bar  ▾ ]
Axis Side:  [ Left ▾ ]   Primary Axis for this Side?: [ Yes ▾ ]

[Back] [Next] [Finish] [Cancel]

\* Required

FIG. 20

ANALYZING INFORMATION TECHNOLOGY SYSTEMS USING COLLABORATIVE INTELLIGENCE DATA ANONIMITY

CROSS REFERENCE TO RELATED APPLICATIONS

This application claims the benefit of U.S. Provisional Patent Application No. 60/885,080, filed Jan. 16, 2007, titled "Systems and Methods for Analyzing Information Technology Systems using Collaborative Intelligence," the contents of which are hereby incorporated by reference herein.

TECHNICAL FIELD

The present invention relates to systems and methods for analyzing information technology systems or components thereof and, more particularly, to such systems and methods that may employ collaborative intelligence, such as rules or report templates entered by a community of users.

BACKGROUND ART

Information technology (IT) managers in small and large enterprises make many decisions about data centers and other hardware and software infrastructure components they maintain. For example, backing up data is an important component of a disaster recovery plan. Having a sufficient number of backup servers to periodically backup this data quickly, so as not to interrupt normal enterprise operations, is, therefore, important. However, budgetary, space, air conditioning and other constraints may limit the number of backup servers that a data center may house. Consequently, an IT manager needs to carefully consider current and anticipated backup loads when determining the number of backup servers to maintain. IT managers make many similar decisions regarding data storage servers, e-mail servers, network components, user workstations, software upgrades and the like.

Unfortunately, many of these decisions are made with little or no contextual information to guide the decision-makers. Consultants, analysts and product vendors have developed businesses providing advice to these decision-makers. However, such advice is often biased toward products or other services that the advisers represent.

Furthermore, the advice is usually based on only a current snapshot of the IT system of interest, without the advantage of historical data on the IT system or data about similarly configured systems in other enterprises. IT organizations are generally reluctant to make their data available to outsiders, due to privacy concerns. Thus, IT managers have no way to objectively compare their systems to similarly configured or similarly loaded IT systems in other enterprises.

SUMMARY OF THE INVENTION

One embodiment of the present invention provides a method for analyzing an information technology system of interest. For each of a plurality of other information technology systems, the method includes automatically collecting configuration data and performance data related to components of the information technology system. A subset of the collected data is selected based on at least one user-entered criterion. A statistical value is calculated from the selected subset of the collected data, and the calculated statistical value is compared to a value associated with a component of the information technology system of interest. A result of the comparison is displayed.

The subset of the collected data may be selected by selecting a subset of the plurality of information technology systems, based on at least one user-entered criterion.

The at least one user-entered criterion, upon which the selection of the subset of the plurality of information technology systems is based, may include a reference to performance data or configuration data related to the information technology system of interest. In this case, selecting the subset of the plurality of information technology systems includes selecting information technology systems from which was collected performance data or configuration data that is similar, within a predetermined limit, to the performance data or configuration data related to the information technology system of interest.

The value associated with the component of interest (and that is compared to the calculated statistical value) may be accepted as a user input. The value associated with the component of interest may be automatically collected from the information technology system of interest. Automatically collecting the value may include collecting the value from the information technology system of interest in response to a user request. Collecting the performance data may include repeatedly collecting the performance data at spaced-apart points in time.

The method may further include sending the collected data from a plurality of information technology systems, via a wide-area network, to a central system or to a distributed system and storing the collected data in a database associated with the central system or the distributed system.

Displaying the result may include generating an indication if the value associated with the at least one component of interest is greater or less than the calculated statistical value by more than a predetermined amount.

The method may include accepting user-submitted rules for evaluating data items in the collected data. Comparing the calculated statistical value may include comparing the calculated statistical value to the value associated with the component of the information technology system of interest according to a criterion specified by at least one of the user-submitted rules.

A score may be assigned to each user-submitted rule. The score may be assigned by accepting votes. The user-submitted rules may be vetted according to the assigned scores. The user-submitted rules may be vetted, including by collecting opinions regarding ones of the user-submitted rules from a community of users. The user-submitted rules may be vetted by accepting votes reflecting opinions regarding ones of the user-submitted rules and/or by ranking the user-submitted rules based on the collected votes.

A user-submitted rule may include a data identifier that identifies the values to be compared, a condition that defines the comparison to be performed and a consequence that defines at least a portion of the result to be displayed.

Identification information in the collected data may be modified prior to calculating the statistical value. The identification information may be modified by removing or replacing at least part of the identification information. All or part of the identification information may be modified by replacing the at least part of the identification information with a pseudonym. In addition, a copy of the pseudonym may be stored in association with the replaced at least part of the identification information.

Modifying the identification information may include modifying Internet protocol (IP) addresses from the collected data, modifying server names from the collected data, modifying customer names from the collected data and/or allowing a user to specify identification information to be modified in the collected data.

In addition, the collected data may be aggregated in a database. Identification information may be removed from the collected data prior to aggregating the data in the database. At least some of the collected data may be quantized.

Another embodiment of the present invention provides a system for analyzing an information technology system of interest. The system includes a server that is configured to automatically receive, from each of a plurality of information technology systems, configuration data and performance data related to components of the information technology system. The server selects a subset of the received data, based on at least one user-entered criterion, and calculates a statistical value from the selected subset. The server compares the calculated statistical value to a value associated with a component of the information technology system of interest and displays a result of the comparison.

Yet another embodiment of the present invention provides a method for comparing an information technology system of interest to other, similar, information technology systems. For each of a plurality of information technology systems, configuration data and performance data related to components of the information technology system are automatically collected. A subset of the information technology systems is selected, based on at least one user-entered similarity criterion. A subset of the data collected from the selected subset of information technology systems is selected, based on at least one user-entered data selection criterion. A statistical value is calculated from the selected subset of the data, and the calculated statistical value is compared to a corresponding value associated with a component of the information technology system of interest. A result of the comparison is displayed.

Another embodiment of the present invention provides a method for analyzing an information technology system of interest. For each of a plurality of information technology systems, configuration data and performance data related to components of the information technology system are automatically collected. A plurality of groups of information technology systems represented by the collected data is identified. Each identified group consists of information technology systems having at least one common characteristic. One of the groups is selected, such that at least one of the characteristics of the selected group matches a corresponding characteristic of the information technology system of interest. A statistical value is calculated from the selected group, and the calculated statistical value is compared to a value associated with a component of the information technology system of interest. A result of the comparison is displayed.

The plurality of groups of information technology systems may be automatically identified, including based on a user input.

One of the groups may be selected based on a user input. Optionally or alternatively, the group may be selected, including automatically determining the characteristic of the information technology system of interest and automatically selecting the group based on the characteristic of the information technology system. The characteristic of the information technology system of interest may be automatically determined in response to a user command.

Yet another embodiment of the present invention provides a method for analyzing an information technology system of interest. For each of a plurality of information technology systems, configuration data and performance data related to components of the information technology system are automatically collected. The method includes automatically identifying a plurality of groups of information technology systems represented by the collected data. Each identified group consists of information technology systems having at least one common group characteristic. The method also includes selecting one of the plurality of groups, such that at least one of the characteristics of the selected group matches a corresponding characteristic of the information technology system of interest. The method further includes selecting a set of analysis rules based on the selected group, analyzing a value associated with the component of interest according to at least one of the selected set of analysis rules and displaying a result of the analysis.

One embodiment of the present invention provides a method for analyzing a component of interest of an information technology system. The method includes accepting user-submitted rules from a community of users. Each rule includes at least one value and an associated criterion. The method also includes comparing a value associated with the component of interest to the values of at least some of the user-submitted rules according to the criteria associated with the respective rules. If, as a result of the comparison, the value associated with the component of interest meets the criterion of a rule, a message is displayed.

Another embodiment of the present invention provides a method for analyzing an information technology system. The method includes collecting configuration data and performance data related to components of the information technology system. The method also includes selecting a subset of the collected data, calculating a statistical value from the selected subset and comparing the calculated statistical value to a selected value associated with a component of the information technology system. A result of the comparison is displayed.

The subset of the collected data may be selected based on at least one user-entered criterion.

Selecting the subset of the collected data may include selecting a subset that represents a first time period. The first time period is prior to a time period represented by the selected value associated with the component of the information technology system. As a result, the selected value associated with the component of the information technology system is compared to historical data related to at least one component of the information technology system.

The calculated statistical value may be compared to the value associated with the component of the information technology system according to a predetermined criterion.

The criterion specify the first time period.

The method may also include accepting user-submitted rules from a community of users. In this case, the criterion is defined by one of the user-submitted rules.

The criterion may specify the first time period.

Yet another embodiment of the present invention provides a method for producing a report related to an information technology system. The method includes collecting configuration data and performance data related to components of the information technology system. The method also includes accepting user-submitted report component templates. Each report component template specifies at least one data item, selected from the configuration data and the performance data, that is to be included in a report component. Each report component template also specified a format in which the data item is to be included. The method further includes accepting user-submitted report templates, each report template specifying a set of report components that are to be included in a report and a layout of the report components, selecting a subset of the collected data and generating a report of the selected subset of the collected data according to a selected report template.

The format in which the data item is to be included may include a graph, a chart, a table, text and/or a block diagram.

Accepting a user-submitted report component template may include displaying a list of data items available for inclusion in the report component, accepting a user input that identifies at least one of the data items and including an identification of the identified data item in the report template.

Accepting a user-submitted report template may include displaying a list of available report component templates, accepting a user input that identifies at least one of the displayed list of available report component templates and including an identification of the identified report component template in the report template.

One embodiment of the present invention provides a computer program product for use on a computer system. The computer program analyzes an information technology system of interest. The computer program product includes a computer-readable medium that stores computer instructions. If and when the instructions are executed by a processor, the instructions cause the processor to receive, from each of a plurality of other information technology systems, configuration data and performance data related to components of the information technology system. The instructions also cause the processor to select a subset of the received data, based on at least one user-entered criterion. The instructions further cause the processor to calculate a statistical value from the selected subset and to compare the calculated statistical value to a value associated with a component of the information technology system of interest. The instructions cause the processor to display a result of the comparison.

BRIEF DESCRIPTION OF THE DRAWINGS

The invention will be more fully understood by referring to the following Detailed Description of Specific Embodiments in conjunction with the Drawings, of which:

FIG. 6 is a schematic diagram of a user interface for accepting user-submitted rules, according to one embodiment of the present invention;

FIG. 10 is a schematic diagram of two exemplary table report component templates, according to one embodiment of the present invention;

FIG. 19 is a schematic diagram of a user interface for defining a table report component, according to one embodiment of the present invention; and FIG. 20 is a schematic diagram of a user interface for defining a chart report component, according to one embodiment of the present invention.

DETAILED DESCRIPTION OF SPECIFIC EMBODIMENTS

Figure 1:
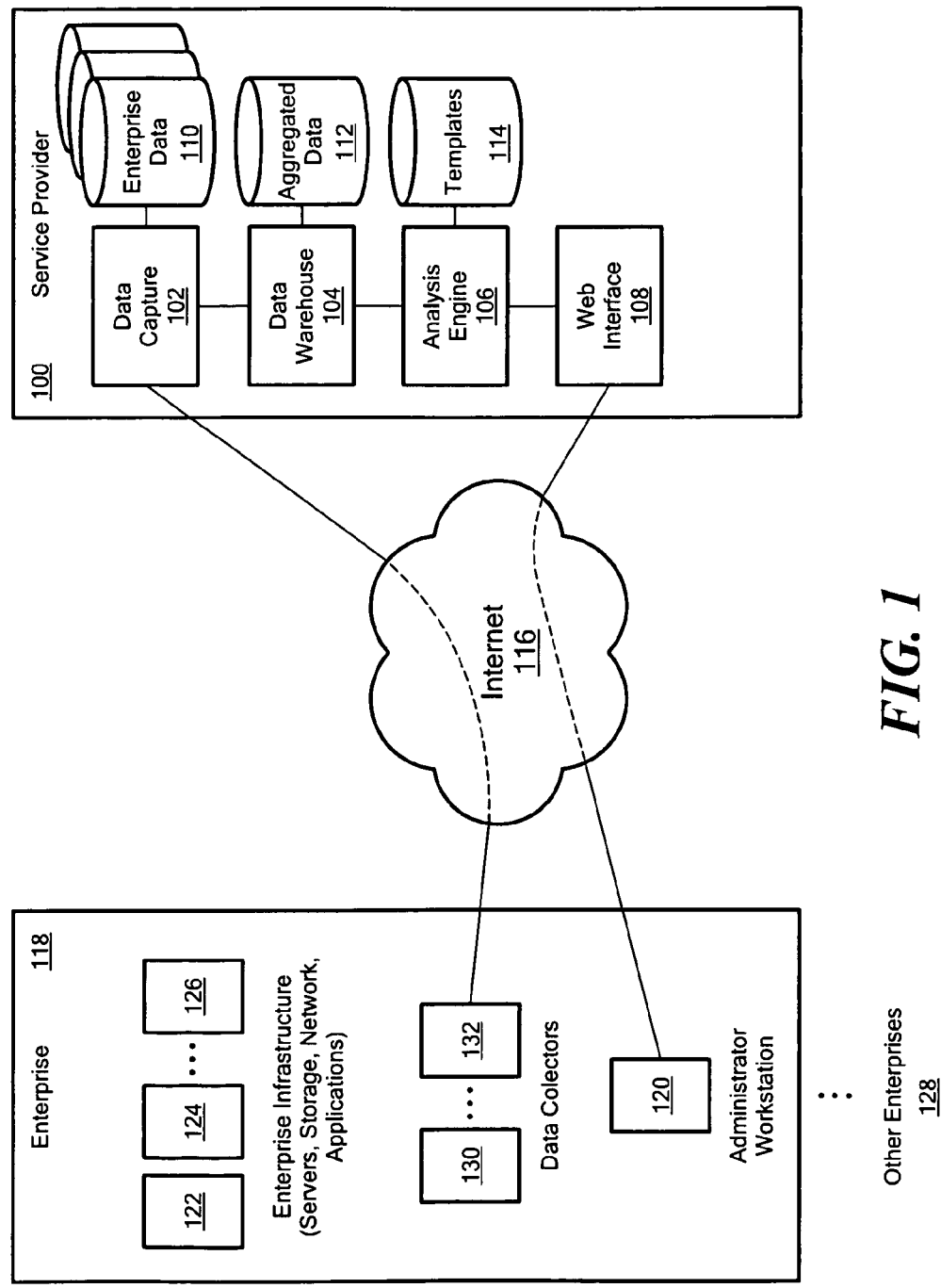
FIG. 1 contains a block diagram of a system for analyzing an information technology (IT) system of interest, according to one embodiment of the present invention, as well as an exemplary context in which the embodiment may operate.

In accordance with the present invention, methods and apparatus are disclosed for analyzing an information technology (IT) system of interest. An IT system may be one or more computers (such as workstations or servers), storage devices, etc., interconnected by a network, as well as network elements (such as routers and switches) used to create the network. Typically, although not necessary, all the components of an IT system serve a single enterprise, however a single enterprise may include more than one IT system. Each IT system may include a number of system components, such as the computers and network elements mentioned above, as well as peripherals attached to these computers and software executed by the computers.

Some of the disclosed methods and apparatus gather performance and configuration data from IT systems or components of the systems (also referred to as "system components") (collectively referred to as "IT systems") in various enterprises, and then "sanitize" the data by removing or masking identifying information before storing the sanitized data in a data warehouse. In addition, data from an IT system may be aggregated in the warehouse with data from other IT systems (possibly in other enterprises) that have similar characteristics, such as size, workload or software versions. An IT manager may compare data from his/her IT system to data from IT systems having similar workloads, configurations, problems or according to other matching criteria, without obtaining confidential information about the comparison systems. Such a comparison may reveal key (but non-confidential) differences between the IT manager's system and the similar systems. For example, the IT manager's system may use a different version of e-mail server software than many or all of the comparison systems, which may suggest that upgrading the e-mail server software may solve a problem that is being experienced with the IT manager's system, or that there may be some other reason why many or all of the comparison systems use a different version of the e-mail server software than the IT manager's system.

The IT manager may specify criteria to select the data that (or the IT systems, whose data) is to be compared to the data from the IT manager's IT system. Alternatively, methods and apparatus are disclosed for automatically selecting the data (or systems) that are to be compared to the data from the IT manager's system. These methods and apparatus may automatically identify groups of IT systems that have similar characteristics and select one or more of these groups for comparison to the IT manager's system. These characteristics may be predefined, or they may be automatically discovered. Furthermore, many overlapping groups of IT systems may be identified using the data in the data warehouse. Thus, an IT system may be a member of several groups. For example, one IT system may be a member of a group of IT systems that all handle a certain range of e-mail volume, and the same IT system may be a member of a different group of IT systems that all include a particular vendor's storage hardware.

Some of the disclosed methods and apparatus store historical information for a given enterprise's IT system. An IT manager may compare an IT system's current data to this historical data. Such a comparative analysis ("change audit") may be used to analyze or detect changes in performance, workload or software or hardware configuration. Such analyses may be useful for traditional IT planning purposes. In addition, results from a change audit may be useful in complying with regulatory requirements, such as the Sarbanes-Oxley Act.

Some disclosed methods and apparatus employ collaborative, community-based sharing of expert knowledge, analysis and advice. For example, in some embodiments, IT managers may submit "rules" that they have found to be useful in analyzing or managing their own systems. A rule may, for example, analyze a particular item (such as server CPU utilization) of the configuration data or performance data according to a predetermined criterion. The rule may also provide a consequence. For example, if the data item satisfies the criterion (such as exceeding a predetermined threshold, such as 70%), a message that contains a recommendation may be displayed. Other IT managers may apply these rules to their own systems' data and, thereby, utilize the collective expertise of the people who submitted the rules.

In some embodiments, users of the rules may vote or otherwise express opinions concerning the usefulness, accuracy, etc. of individual rules. Some of these embodiments rank the rules, based on the user opinions. In some embodiments, which rules are applied to a given set of data may depend on a characteristic of the data set. For example, some rules may be applied to data from IT systems that serve more than a predetermined number of users.

Some of the disclosed methods and apparatus prepare reports from the data gathered from an IT system, or from a comparison between the IT system and other IT systems, or from a comparison between the IT system and historical data from the same IT system. Each report includes one or more "report components." A report component is a discrete portion of a report that presents predefined and/or automatically generated data. Examples of report components include text blocks, tables, charts, graphs, block diagrams and spreadsheets.

A "report template" identifies one or more report components that are to be included in a particular report, as well as the arrangement of the report components within the report. Templates for reports may be predefined. In addition, as with user-submitted rules, in some embodiments, IT managers may submit templates for reports, and these and other IT managers may use the templates to produce reports from data from their own systems. Thus, IT managers may benefit from useful report designs that have been created by others.

A "report component template" is a template for a report component. A report component template identifies one or more types of data to be included in a report component, as well as a form in which the data is to be presented in the report component. Exemplary types of data include server CPU utilization, e-mail server software version number and workstation system name. Exemplary forms in which data may be presented include text blocks, tables, graphs and charts. As with report templates, report component templates may be predefined and/or user-submitted. Thus, IT managers may benefit from useful report component designs that have been created by others.

Rules may be used to automatically include or exclude report components, portions of report components or portions of reports. Voting or other methods may be used to rank or vet report templates and report component templates. "Vetting" means evaluating for possible approval, ranking, acceptance or rejection.

It should be noted that report templates and report component templates contain no IT system data. A report template simply defines what report components are to be included in a report, and a report component template defines what data are to be included in a report component and the format of the data. Only when a template is used to generate a report from a data set is data presented to a user. Generally, a template may be used with any data set from any enterprise or from data aggregated from several enterprises. Thus, templates are generic, in that they are reusable and not typically specific to a particular IT system. Furthermore, templates may be disclosed to, and used by, IT managers other than the IT managers who created the templates, without revealing confidential data. On the other hand, a particular enterprise's data may not be used by another enterprise to produce a report, even with a shared template, except to the extent that the data has been previously aggregated or otherwise made anonymous with other enterprises' data.

System Architecture

As noted, some embodiments gather performance data and configuration data from IT systems in various enterprises and store the data in a data warehouse. FIG. 1 contains a block diagram of one such embodiment and an exemplary context in which the embodiment may operate. A service provider 100 operates several systems, including a data capture system 102, a data warehouse 104, an analysis engine 106 and a web interface server 108. Each of these systems may be a separate computer or group of computers, or some or all of these systems may share a common computer.

The data capture system 102 captures data from one or more enterprise IT systems (as described in more detail below) and stores the data in respective per-enterprise data stores 110. An IT manager may then compare data that describes the enterprise's current IT system to historical data stored in the appropriate per-enterprise data store 110. The data that describes the current IT system may also be stored in the per-enterprise data store 110, or the data may be otherwise obtained. For example, current data may be automatically collected from the IT system (in a manner similar to that described below) without storing the current data in the per-enterprise data store 110. The system may collect this current data from the IT system in response to the IT manager requesting a report or in response to an explicit request from the IT manager to collect current data. Alternatively, the IT manager may enter data about the current IT system via an appropriate user interface. Preferably, the data warehouse 104, and optionally the per-enterprise data stores 110, is a relational database organized according to a star schema, although any suitable database and/or schema may be used.

The data warehouse 104 aggregates data from multiple enterprises (i.e., from several of the per-enterprise data stores 110) into an aggregated data store 112. "Aggregation" means summing or calculating a statistical value (such as an average, mean, median or mode) from data from multiple enterprise IT systems that have some characteristic(s) in common, using a data value that is identical in all the similar IT systems or simply counting the number of IT systems that have the characteristic(s) (collectively "calculating a statistical value"). For example, data from e-mail servers that handle similar e-mail message volumes may be averaged or added together or the version number of the e-mail server software (if identical for all the aggregated servers) may be stored or the number of such servers may be counted In such an embodiment, data from e-mail servers may be aggregated based on the number of e-mail messages handled per day by the servers. For example, data from e-mail servers that handle between zero and 1,000 e-mail messages per day may be aggregated together. Similarly, data from other groups of e-mail servers may be aggregated based on their respective ranges of e-mail volume, such as 1,001 to 100,000, 100,000 to 1,000,000 and over 1,000,000 e-mail messages per day. These ranges may be predetermined or they may be automatically discovered by the data warehouse 104. For example, the data warehouse 104 may employ known knowledge discovery, data mining or information extraction techniques, such as fuzzy logic, genetic algorithms, group detection algorithms (GDA), k-groups (Kubica, et al., 2003) or algorithms for group discovery on large transactional data (such as XGDA), to discover underlying groups or clusters in the data.

As noted, data from multiple enterprise IT systems that have one or more characteristics in common may be aggregated together. For data aggregation purposes, exemplary characteristics include: volume of transactions processed (such as in the e-mail message volume example discussed above); load levels (such as central processor (CPU) or disk storage space utilization); interactive response time; throughput rates; number of lost or dropped network packets; numbers, types, configurations or vendors of computers in the enterprise (such as processor speed, memory size or whether the enterprise utilizes network attached storage or storage area networks); numbers, types, vendors or versions of application programs executed by computers within the enterprise; all or a portion of the Internet protocol (IP) address of a computer within the enterprise; and geographic location, size, business, number of employees or number of customers of the enterprise.

It should be noted that aggregating data from IT systems that are members of a common group provides a level of anonymity to the data. For example, aggregating data from IT systems that all handle similar volumes of e-mail messages or backup jobs reduces the possibility of a third-party associating a set of data with a particular enterprise, because the data may be aggregated based on ranges of volumes, and several different enterprises may fall within a given range. Similarly, if data is aggregated based on a portion of the IP address of a computer within an enterprise, data for many organizations may be aggregated together (because computers in all these organizations have identical portions of the IP address), thus reducing the possibility that the portion of the IP address may be used to identify a particular enterprise or a particular computer.

Safeguards may prevent presenting aggregated data from a small number (such as one, two or any suitable number) of information technology systems, because displaying information about such a small group of information technology systems, or allowing a user to specify criteria that selects such a small group, may allow the user of the displayed data to identify the service information technology system or enterprise. For example, specifying a geographical area (ex., Redmond, Wash.), a line of business (ex., software producer) and a portion of an IP address (ex. 207.46.xxx.xxx) may allow a user to effectively select a single enterprise. In embodiments that include these safeguards, if a user-specified or automatically-selected group of information technology systems is smaller than a predetermined number, the system does not display information about the group of information technology systems.

The analysis engine 106 accesses the per-enterprise data 110, the aggregated data 112 and user-entered or automatically-collected current data about an IT system to produce reports. As noted, these reports may compare an IT system ("a system of interest") to other IT systems, such as IT systems that have one or more characteristics in common with the system of interest, or to historical data about the system of interest. A set of report templates and report component templates (collectively referred to as "templates" 114) may be used by the analysis engine 106 to produce these reports. (Templates are discussed in more detail below.) These reports may, for example, be made accessible by the web interface server 108 to users who are connected to the service provider 100 via a wide area network, such as the Internet 116. In this way, a user (such as an IT system administrator) in an enterprise 118 may use a workstation 120 to access the web interface server 108 to select (if necessary) a subset of the data in the aggregated data 112 and/or the per-enterprise data 110 for comparison and to generate and view the reports.

Data Capture

As noted, the data capture system 102 captures data from one or more enterprise IT systems or system components. For example, the data capture system 102 may capture data from an enterprise infrastructure 122, 124 and 126 in the enterprise 118, as well as from enterprise infrastructures (now shown) in other enterprises 128. The enterprise infrastructure 122-126 may include various types of system components, such as computers (workstations, application servers and file storage servers, for example) and network components (such as routers, switches and firewalls), as well as software components (such as application programs, operating systems and utility programs) and the like.

One or more data collectors 130 and 132 collect data from the enterprise infrastructure 122-126 and send the data to the data capture system 102, such as via a wide area network, such as the Internet 116. The data collectors 130-132 may be stand-alone systems, such as laptop computers, servers or "blades." Alternatively or in addition, some or all of the data collectors 130-132 may be hardware or software components embedded in one or more parts of the enterprise infrastructure 122-126. In some embodiments, the data collectors 130-132 execute scripts, which gather data that has been collected by other hardware or software components, such as operating systems, storage servers, backup utility programs, e-mail servers and the like. For example, typical storage servers, such as those available from Network Appliance, Inc.

(Sunnyvale, Calif.), routinely collect performance and/or configuration data. Similarly, other components, such as e-mail servers from Microsoft (Redmond, Wash.), database software from Oracle (Redwood Shores, Calif.) and network components from Cisco Systems, Inc. (San Jose, Calif.) collect, or can be configured to collect, configuration and/or performance data. Alternatively or in addition, custom built or off-the-shelf data collection packages (such as software from Microsoft Corporation, Redmond, Wash. or Diskeeper Corporation, Burbank, Calif.) may be used to collect configuration or performance data.

Data Collection and Processing

As noted, configuration data and performance data may be collected from a number of enterprises 118, 128. Although there may be an overlap between the definitions of configuration data and performance data, configuration data generally describes unchanging or slowly changing characteristics of an IT system or the enterprise to which it belongs, whereas performance data generally describes transient or fast-changing metrics that reflect activity occurring on one or more IT systems or system components. Configuration data include data describing processors (geographic location, manufacturer, speed, architecture, memory size, number and storage capacity of peripheral devices and the like) and data describing software applications (e-mail server package, version and the like), data describing an enterprise (geographic location, number of employees, nature of business and the like). Performance data include data describing resource utilization, remaining capacity, time taken to perform an activity, numbers of transactions performed in a unit of time and the like.

Figure 2:
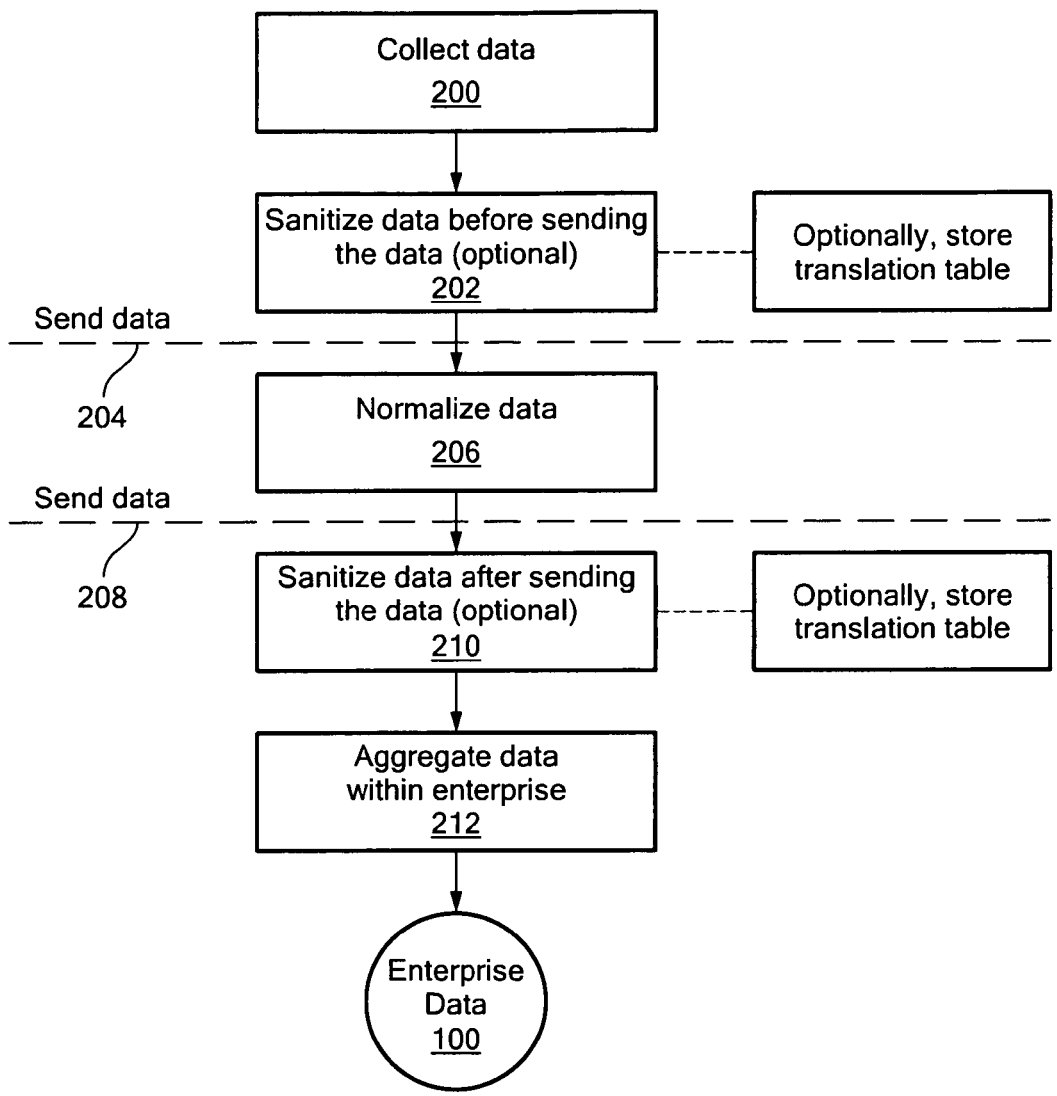
FIG. 2 is a flowchart of data collection in preparation for analyzing an information technology system, according to one embodiment of the present invention.

FIG. 2 is a flowchart of data collection, according to one embodiment of the present invention. At 200, data is collected, such as by the data collectors 130-132 (FIG. 1). Some of this data may be modified or deleted to preserve the anonymity of the enterprise 118, its customers, etc. For example, portions of IP addresses may be deleted or replaced by zeros, placeholders, pseudo-addresses, random data or other values. Similarly, names, such as names of customers, suppliers, servers, workstations or other computers, may be deleted or replaced by blanks, random data, placeholders or pseudonyms. Optionally, a translation table may be created to store and correlate some or all of the original data item values and the values (collectively "pseudonyms") with which the original volume were replaced. That is, for each data item value that is replaced and that may need to be recovered in the future, the data item and its replacement value are stored in the translation table. Table 1 is an exemplary translation table.

TABLE 1

| Original Data Item Value | Pseudonym |
| --- | --- |
| 192.168.0.54 | Print Server |
| 192.168.0.48 | Web Server |
| 216.10.106.149 | 192.168.0.1 |
| ts_svr0892 | Backup Server |
| Bromberg & Sunstein | Customer_43 |

Replacing data items with pseudonyms preserves anonymity in the data. Consequently, an enterprise may submit its data to the data warehouse without risking revealing confidential information. However, the translation table, which may be stored securely at the enterprise, enables the enterprise (or software executing on behalf of the enterprise) to restore the original data item values by replacing pseudonyms with their original data item values, if necessary, to facilitate analyzing the data or producing reports.

Collectively, deleting or replacing data item values (and optionally storing the translation table) are referred to as ways of "sanitizing" the data and are represented in the flowchart at 202. The data items to be modified or deleted may be predetermined, or the IT manager may specify which data items are to be modified or deleted, such as via a user interface. For example, a user interface may display the data items that were collected and that are to be transmitted to the service provider 100 (FIG. 1), and the IT manager may select which of these data items are to be sanitized. Additionally, the IT manager may specify the values of the pseudonyms to be used to sanitize selected ones of the data items. Thus, a user may review, and optionally sanitize, data before it is sent out of the enterprise 118. This process is referred to as "first-stage sanitization."

Optionally or in addition, data may be "quantized," that is, the data may be stored with less precision than the precision with which it was collected. Quantizing data provides a level of anonymity to the data. Several information technology systems, each with a different value of a given metric, may have identical data values stores, because all the systems' data rounds (quantizes) to the same value. Other techniques, such as introducing randomized perturbations in the data, may also be used to prevent a user from being able to identify or select a particular information technology system by specifying a particular data value.

The data collectors 130-132 may use scripts to repeatedly gather data that has been collected thus far by other hardware or software components. Repeatedly gathering data means periodically or occasionally gathering the data. For example, data may be gathered every hour, every day, every week or in response to a predetermined event, such as execution of a backup job or a performance metric exceeding a predetermined value. Because the data may have been collected by a variety of tools, and the tools may have been produced by a variety of vendors, the data may be in a variety of formats, and the data may be labeled differently by each source. For example, CPU utilization from one source (such as an operating system in a file storage server) may be represented as a real number between 0.00 and 1.00, whereas CPU utilization from a different source (such as a third-party performance monitoring package) may be represented as an integer between 0% and 100%. At 206, the data is normalized. That is, like data is reformatted into a single format and, optionally, uniformly labeled. The data may be normalized before the data is sent from the enterprise 118 (FIG. 1) to the service provider 100, or the data may be normalized after the data is received at the service provider 100. Two dashed lines 204 and 208 (FIG. 2) indicate times at which the data may be sent to the service provider 100.

Optionally, once the data is received at the service provider 100, the data may be sanitized for the first time or (if the data was sanitized before it was sent) the data may be further sanitized (referred to as "second-stage sanitization"), as shown at 202. Optionally or in addition, the data may be quantized for the first time or further quantized. As discussed above, an IT manager may wish to delete or modify certain data items (i.e., to sanitize certain portions of the data, as indicated at 202), before sending the data to the service provider 100, to protect information that may be of concern to the enterprise 118. However, the service provider 100 may be concerned about the confidentiality of different (or possibly some of the same) data items. Thus, the service provider 100 may further sanitize or further quantize the data (as indicated at 202) to protect information that may be of concern to the service provider 100. Note that a particular data item may be sanitized or quantized twice, i.e., a first time at 202 by the enterprise 118 and a second time at 210 by the service provider 100. Also as discussed above, the service provider 100 may create and store a translation table that catalogs all or some of the sanitization performed by the service provider 100.

The collected data may be stored in the per-enterprise data store at 110 or, optionally, the data may be aggregated (as shown at 212) before being stored. At this point, this aggregation is performed within a single enterprise 118, not across several enterprises. However, as with aggregation across multiple enterprises 118-128 (discussed above), the data may be aggregated according to common characteristics. For example, data from multiple system components (within a single enterprise IT system) that have some characteristic in common may be aggregated together. Some of the exemplary characteristics discussed above, with respect to aggregation across multiple enterprises, are also applicable to data aggregation within a single enterprise 118. For example, a single enterprise 118 may include multiple e-mail servers, some of which handle larger volumes of e-mail messages than others. Thus, data from groups of these e-mail servers may be aggregated, based on ranges of transaction volumes.

Figure 3:
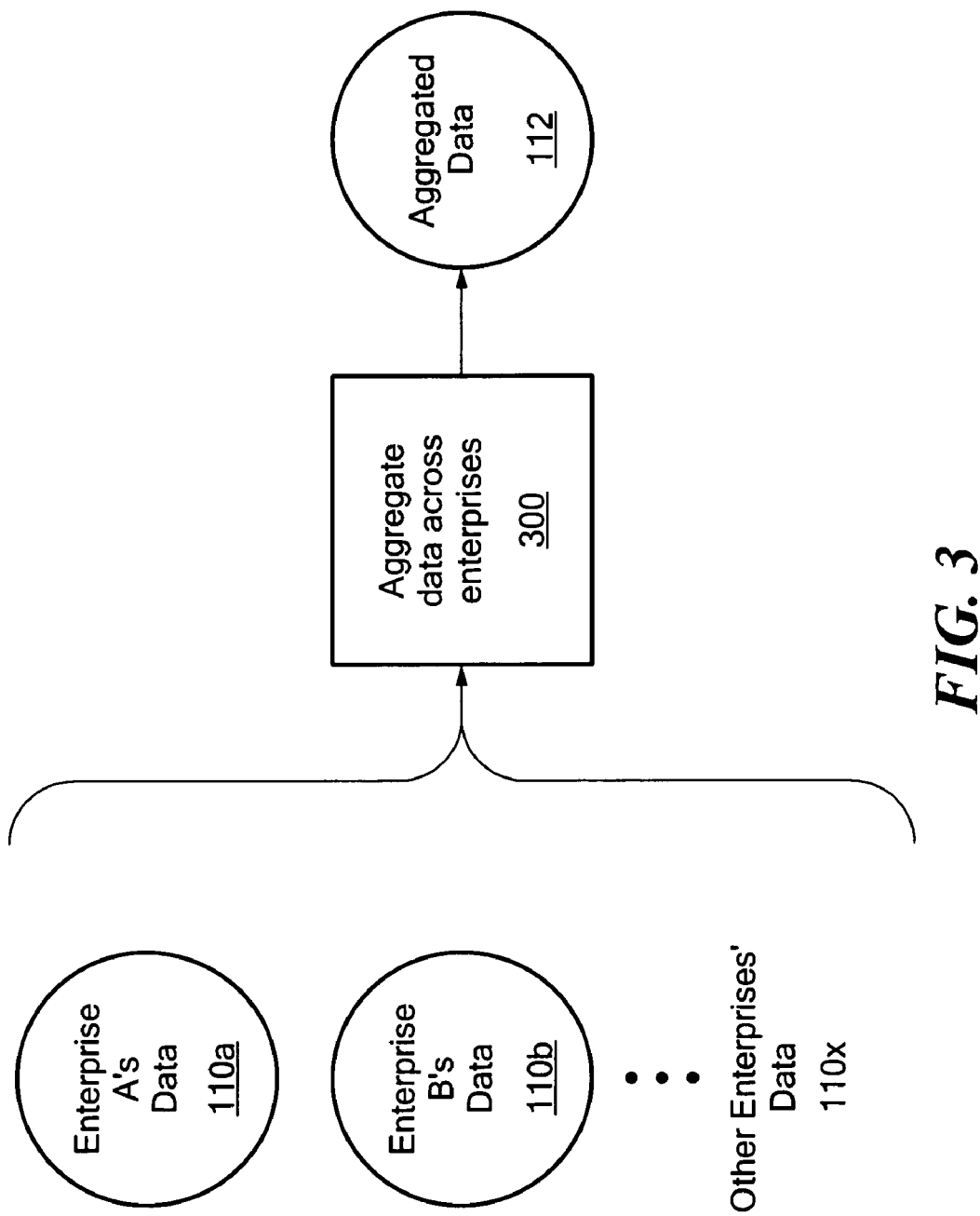
FIG. 3 is a data flow diagram for aggregating data from multiple per-enterprise data stores, according to one embodiment of the present invention.

As discussed above, and as shown in FIG. 3, data from multiple per-enterprise data stores 110a, 110b, 110x, etc. may be aggregated together (as shown at 300), and the aggregated data may be stored in the aggregated data store 112. Sanitization, quantization and/or aggregation may be used to make source of the data more anonymous.

Figure 4:
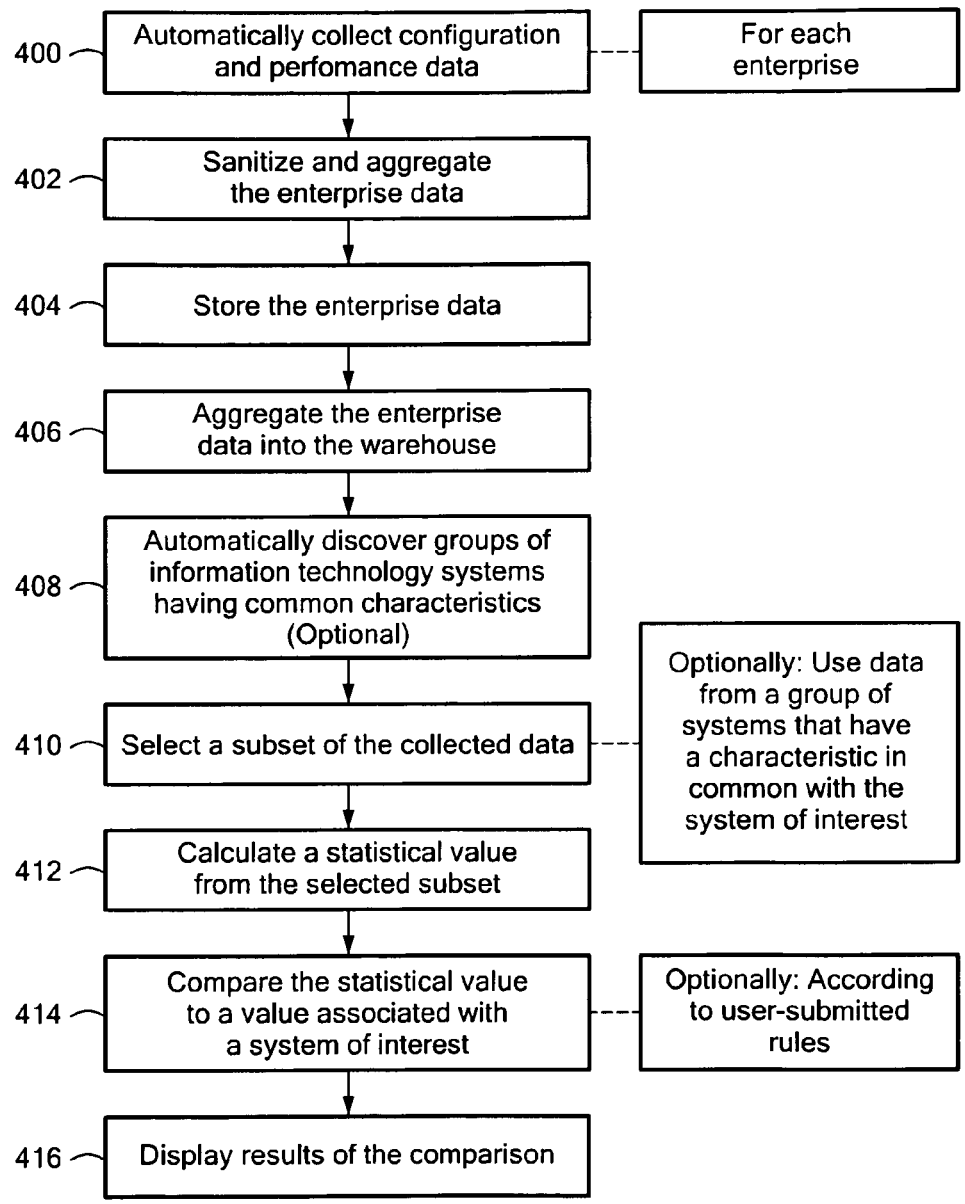
FIG. 4 is a flow chart for analyzing an information technology system of interest, according to one embodiment of the present invention.

The data from one or more enterprises 118, 128 may be used to analyze an information technology system of interest. A flowchart describing such an analysis, according to one embodiment of the present invention, is shown in FIG. 4. At 400, configuration data and performance data from an IT system in each enterprise is collected. At 402, the data from the enterprise IT system is sanitized and aggregated (within the enterprise) and, at 404, the enterprise IT system data is stored in a per-enterprise data store. At 406, the enterprise data is aggregated into a data warehouse, which stores data aggregated from one or more enterprises.

Optionally, at 408, groups of data or groups of IT systems are automatically discovered within the data warehouse. Member IT systems of each group may have at least one characteristic in common. For example, IT systems may be grouped according to transaction volume, workload type, software version number, etc., as discussed above. The characteristics may be predetermined and/or automatically determined.

A subset of the data in the data warehouse is selected at 410. The subset may be chosen based on selection criteria provided by a user, such as an IT administrator, as discussed in more detail below. Optionally, data from an IT system of interest may be used to automatically identify the subset of the data. For example, if the IT systems represented by data in the data warehouse are grouped according to characteristics, these (possibly overlapping) groups of IT systems can be thought of as being represented by (possibly overlapping) subsets of the data in the data warehouse. The same characteristics may be used to determine which of these groups the IT system of interest would fall within, and the corresponding subset of data may be selected.

At 412, one or more statistical values are calculated from the selected subset of data. For example, the most commonly used version of software executed by e-mail servers in the selected subset may be determined. Other examples include: calculating an average of the CPU utilizations of web servers in the selected subset, determining the most common range of transaction volumes (such as web site "clicks," file prints or document creations), up-time percentages or frequency of system restarts.

At 414, the statistical value(s) calculated at 412 is compared to one or more corresponding values associated with the system of interest. These comparisons may be performed according to predetermined rules and/or user-submitted rules. The rules used for these comparisons may be determined by the group, to which the IT system of interest belongs, or to which the comparison systems belong, or a user may select or enter the rules, such as via a user interface. The data values associated with the system of interest may be automatically determined. That is, which data item(s) from the system of interest to process according to the votes, may be determined by the type of data represented by the statistical value. Optionally, which data value(s) associated with the system of interest are compared may be determined by a user, such as via a user interface. For example, an IT manager may specify that data from a particular server is to be compared or that one or more particular data items are to be compared.

Results from these comparisons are displayed at 416. For example, if the corresponding value from the IT system of interest exceeds a threshold, or falls outside a range, specified by a rule, a warning or advisory message may be displayed.

User-Submitted Rules

Figure 5:
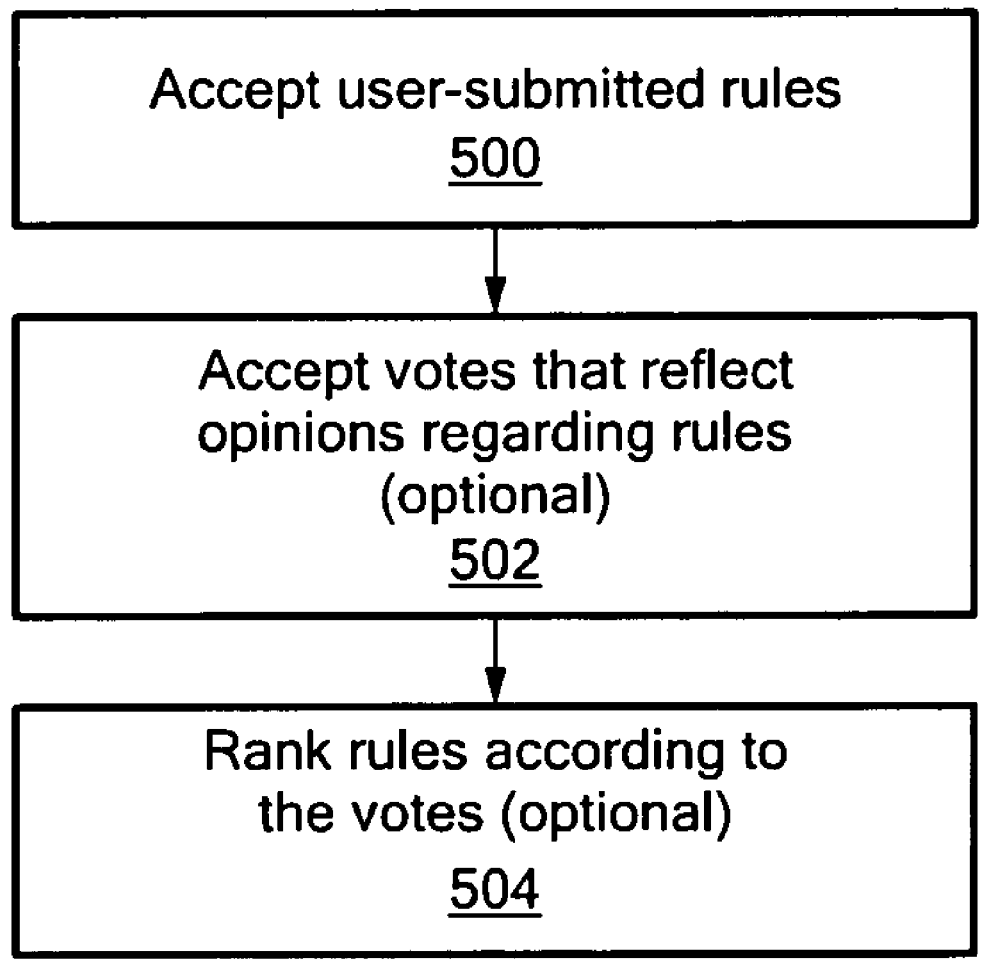
FIG. 5 is a flowchart of operations involved in accepting user-submitted rules, according to one embodiment of the present invention.

In some embodiments, users may submit rules. A flowchart of operations involved in accepting user-submitted rules is shown in FIG. 5. At 500, a user-submitted rule is accepted. As noted, a web interface server 108 (FIG. 1) may provide a web interface, by which the user-submitted rules may be accepted. User-submitted rules may be vetted, such as by a moderator or a group of moderators and/or by votes from other users. For example, the moderator may see, and must approve, all user-submitted rules before the rules are used by the system.

An exemplary user interface for accepting user-submitted rules is shown in FIG. 6. Each rule may be identified by a rule name. A user enters a rule name in an appropriate field 600 to create a new rule or to modify or delete an existing rule. If the user wishes to create a rule similar to an existing rule, the user may invoke a "Copy existing rule" control 602 and enter the name of the existing rule in an appropriate text/pull-down field 604. The attributes of the existing rule are displayed and may be modified by the user before being saved as the new rule. On the other hand, if the user wishes to create the new rule without the benefit of copying all or a portion of an existing rule, the user may invoke a "Start from scratch" control 606.

If the new rule relates to a data item, the user may select the data item from a text/pull-down field 608. The pull-down list of the field 608 is populated with names of the data items in the selected subset of data (i.e., from a subset of the data in the per-enterprise data store 110 or in the aggregated data 112). The available data items include dates and times on which the data was gathered. Thus, a rule can compare a data item that was collected at a particular time to a corresponding data item that was collected at a different time. A condition field 610 allows the user to specify a criterion, such as a condition or comparison between the data item selected in the data item field 608 and a value specified in a comparison field 612. The user may enter an absolute data value or the name of another data item in the comparison field 612, and the user may indicate the type of entry made in the comparison field 612 by selecting an appropriate control 614 or 616.

If the user wishes to create a rule that includes more than one data item or more than one criterion, the user may activate a control 618, which displays a sub-window (not shown) that includes fields similar to the data item text/pull-down field 608, the condition field 610, the comparison field 612 and the controls 614 and 616. The sub-window essentially enables the user to define one or more sub-rules. The sub-window also provides a control by which the user may specify a logical connection among the sub-rules. Thus, the user may specify whether the new rule requires all or just at least one of the sub-rules to be triggered. For example, the user may specify that the sub-rules are to be logically ANDed or ORed together or grouped according to another logical combination. In addition, the sub-window enables the user to group the sub-rules to control the order in which the sub-rules are processed.

For each rule, the user may enter text into a consequence field 620. The text in the consequence field 620 may be displayed in a report or other display, if the rule is triggered. The text in the consequence field 620 may include references to data items, an example of which is shown at 621. If so, these references are replaced by the values of the corresponding data items prior to displaying the contents of the consequence field in a report or otherwise.

Alternatively or in addition to specifying text in the consequence field 620, the user may recommend changing a particular performance or configuration value. For example, the user may recommend upgrading to a particular version of an e-mail server or increasing CPU speed, memory size or disk storage by a fixed amount or according to a formula, such as multiplying the current value by a factor of 1.5. If the user wishes to make such a recommendation, the user invokes a control 624. The user also specifies the data item that should be changed via a data item text/pull-down field 626 and the recommended new value for the data item via a value field 628.

When the user is satisfied with the definition of the rule, the user may invoke a "Save rule" control 628. Alternatively, if the user wishes to delete a previously-defined rule, the user may invoke a "Delete rule" control 630. If the user wishes to perform neither operation, the user may invoke a "Cancel" control 632.

Although not shown in the user interface of FIG. 6, a system that accepts user-submitted rules may require a user to enter logon information, such as a username and password, prior to creating, modifying or deleting rules. In addition, rules may be automatically associated with the users who created the rules, such that only the creator of a rule may delete or modify that rule. In addition, associating each rule with the rule's creator facilitates distinguishing between identically-named rules that were created by different users. Thus, a rule name may be qualified by an identifier associated with the person who created or modified the rule. Associating a user with all the rules created by the user facilitates rating or vetting rules based on the user's rating or reputation, which may be calculated based on all the rules created by the user. Thus, newly created rules may be given an initial rating, based on ratings of rules previously created by the same user who created the new rule.

Alternatively or in addition, a voting mechanism may be used to vet the rules. A web interface, such as a web interface server 108 or a similar server, may accept votes or other indications from users having opinions regarding the predetermined or user-submitted rules, as shown in 502. Optionally, at 504, the rules may be ranked or rated according to the votes or other indications of opinions. The ranks or ratings may be used to determine which rules are used in the calculations 412 (FIG. 4) described above. For example, only rules having ranks or rating greater than a predetermined value may be used in the calculations. Optionally, the rules may have weights that are determined, at least in part, based on the ranks or ratings; and a rule's weight may be used to estimate a significance of the rule when displaying a message. For example, if a rule related to CPU utilization is triggered, the resulting message may be of the form: "Your system's CPU utilization exceeds the average CPU utilization of systems handling similar volumes (10,000 to 50,000 requests per day) of HTTP requests. Users have indicated that the significance of this fact is 3 on a scale of zero (least significant) to 5 (most significant)."

Optionally, the analysis system may estimate a probability that making a recommended change will solve a problem, or the analysis system may calculate an average change in a metric that is likely to result from making the change. For example, if a rule recommends a change, such as changing an e-mail server version (as discussed above, with respect to FIG. 6), the analysis system may identify data in the data warehouse 104 that represent other systems that are similar to the IT system of interest and that have made the recommended change. The analysis system may compare a performance metric or a calculated statistic for the other systems before the change was made to after the change was made to determine an expected result of making the change. The analysis system may present the expected result, such as by generating text similar to, "73% of other IT systems that handle similar volumes of e-mail messages (i.e., 1,001 to 100,000 e-mail messages per day) and that have changed from Exchange Server Version 2003 to 2003 SP2 have experienced a statistically significant decrease in message latency" or "Other IT systems that handle similar volumes of e-mail messages (i.e., 1,001 to 100,000 e-mail messages per day) and that have changed from Exchange Server Version 2003 to 2003 SP2 have experienced an average decrease in message latency of 1.2 seconds."

The analysis system may compare a performance metric or a calculated statistic of an IT system of interest to that of other systems that are similar, except that the other systems have made the recommended change or operate under the recommended value without necessarily having changed to that value. For example, the analysis system may generate text similar to, "The IT system of interest uses Exchange Server Version 2003. Other IT systems that handle similar volumes of e-mail messages (i.e., 1,001 to 100,000 e-mail messages per day), but that use Exchange Server Version 2003 SP2, have an average message latency time that is 2.3 seconds less than that of the IT system of interest."

A rule may be vetted by comparing IT systems that operate according the rule to IT systems that do no operate according to the rule. If a rule recommends a change, the analysis system may compare a performance metric or a calculated statistic of IT systems that operate according to the recommended value to a performance metric or a calculated static of IT systems that do not operate according to the recommended value. If the difference between the compared values is statistically significant, and the IT systems that operate under the recommended value perform better than those that do not, the rule may be accepted, otherwise the rule may be rejected. Optionally, the rule may be rated, based on the amount of improvement seen in the IT systems that operate under the recommended value, compared to those that do not.

Data Subset Selection

Figure 7:
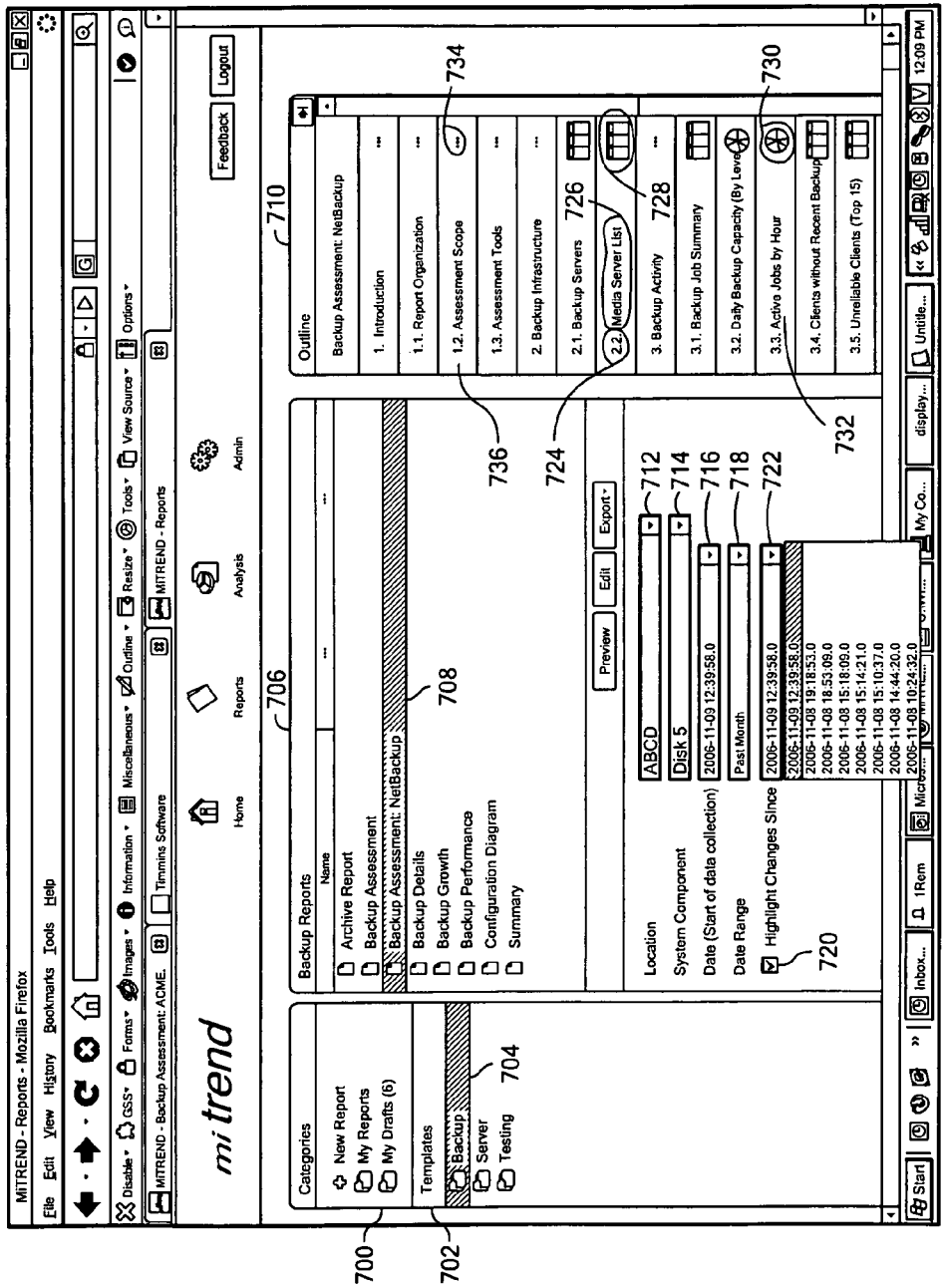
FIG. 7 is a schematic diagram of a user interface for selecting a subset of data to compare to an IT system of interest, according to one embodiment of the present invention.

FIG. 7 shows an exemplary user interface for selecting a subset of data that was previously collected about an IT system of interest ("historical data") and for requesting a report that compares current data from the same system to the historical data. Reports may be saved in folders and subfolders, as shown at 700. New reports may be generated according to previously-defined report templates or according to instructions provided interactively by a user through the user interface. Available report templates may be organized in folders and subfolders, as shown at 702. A user selects a category of templates, such as "Backup" report templates, as indicated at 704. Available report templates in the selected category are listed at 706. The user may select a report template, such as "Backup Assessment: NetBackup," as indicated at 708. An outline 710 indicates report components that are included in a report that would be produced according to the selected report template 708. (Report templates and report components are described in detail below.)

Using a control 712, the user may specify a location where the IT system of interest is located. This may be, for example, a location of one of several data centers within the user's enterprise. When data is collected from IT systems, a location is associated with each IT system. The available locations are used to populate the control 712 to facilitate selecting from the available locations. The user may also focus the report on a particular system component by selecting a system component using a control 714. A list of system components, for which data is available, is used to populate the control 714.

The user may select a starting date with a control 716 and a length of time with another control 718 to select a time-related subset of historical data to compare to the IT system of interest. In addition, the user may activate a control 720 and specify a time 722 to highlight changes in the IT system of interest since the specified time.

Essentially, the user's inputs via the controls 712-722 form a query that a report generator may use to request data from the data warehouse.

Using a user interface similar to the one shown in FIG. 7, a user may select a subset of the data or systems in the data warehouse to be compared to the IT system of interest. In one embodiment, the user may select time frames (during which the data was collected), system characterizations, enterprise characterizations or other ways, or combinations of ways, of selecting data. As noted, systems may be characterized according to their hardware or software configurations, system components, workloads, geographic locations and the like, and enterprises may be characterized according to their numbers of employees, lines of business, etc. These characteristics may be supplied by the enterprise whose data is collected and/or the characteristics may be automatically discovered. A user interface for selecting a subset of the data or systems in the data warehouse for comparison includes controls for specifying one or more of these characteristics.

Report Generation

Some embodiments of the present invention generate reports, such as a result of comparing an IT system of interest to historical information about the same system or to other systems that have similar characteristics or to a subset of data selected by a user. These reports may be generated according to templates; each report includes at least one report component. As noted, in FIG. 7, the outline 710 includes a list of report components that would be included in a report generated according to the corresponding report template 708. The report components are organized according to a hierarchy indicated by outline numbering, such as at 724. Each report component has a name, such as indicated at 726. In addition, each report component's type is indicated by an icon. For example an icon 728 indicates that the "Media Server List" 726 is a table, and an icon 730 indicates that the report component "Active Jobs by Hour" 732 is a chart. An icon 734 indicates that the "Assessment Scope" 736 is text.

Figure 8:
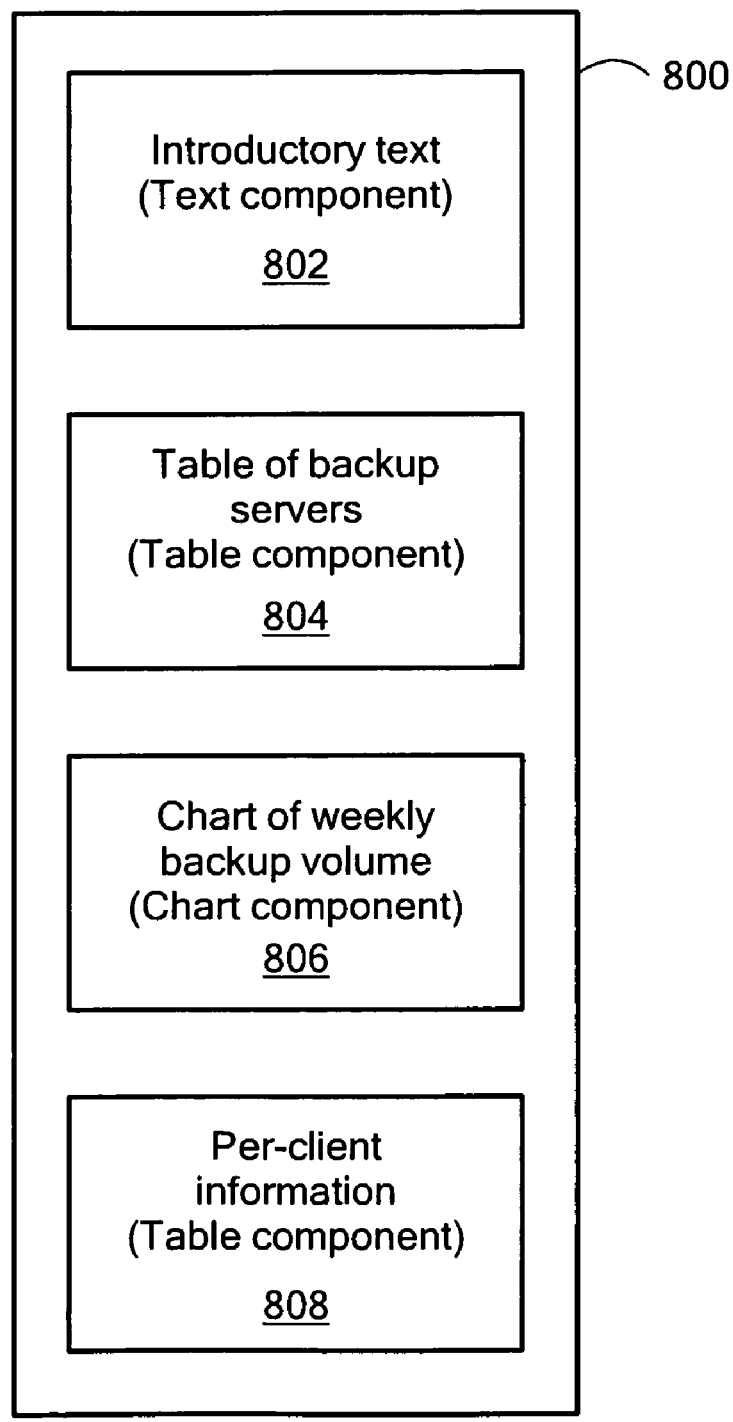
FIG. 8 is a schematic diagram of an exemplary report that includes four exemplary components, according to one embodiment of the present invention.

FIG. 8 is a schematic diagram of an exemplary report 800 that includes four exemplary report components 802, 804, 806 and 808. A report template identifies the contents and layout (such as the order of the report components) of a report by identifying one or more report component templates that are to be used to generate the report. A report component template identifies the contents and format of data that is to be presented in the corresponding report component.

Figure 9:
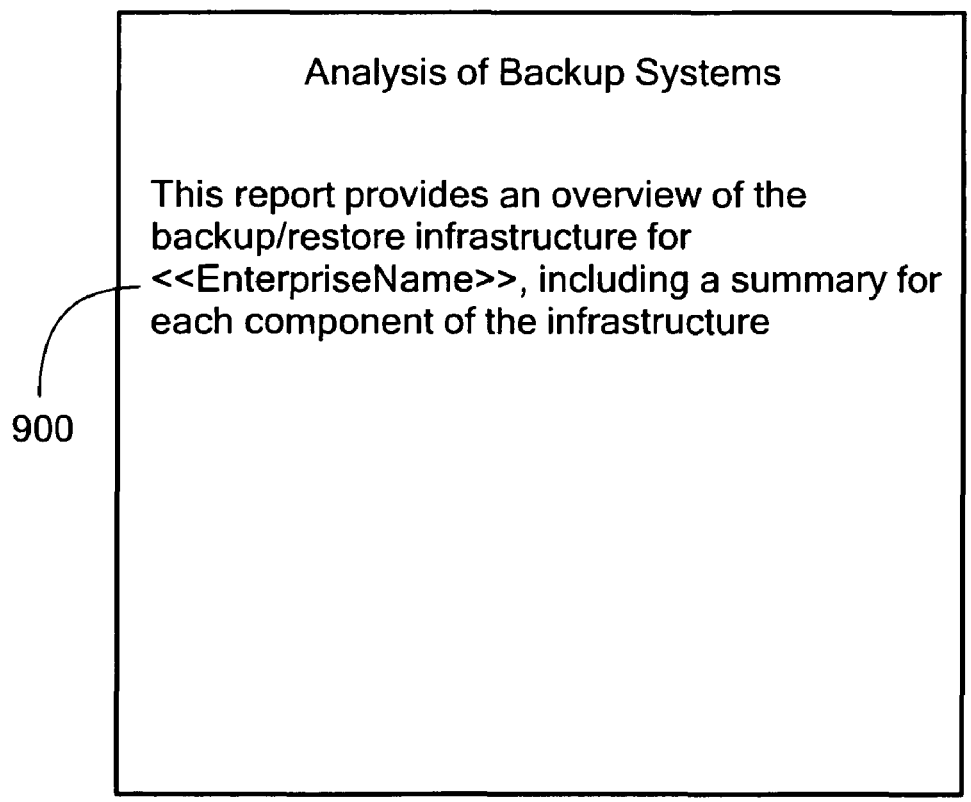
FIG. 9 is a schematic diagram of an exemplary text report component template, according to one embodiment of the present invention.

The first exemplary report component 802 of the report 800 is a text component, such as a title and/or introductory text. A text component may include predetermined text and/or automatically generated text, page breaks and text formatting, such as font, point size, indentation, etc. Predetermined text may, for example, be "boilerplate" text, such as one or more paragraphs introducing the report and describing a type of analysis that was performed on the data. FIG. 9 is a schematic diagram of an exemplary text report component template.

Generated text may be independent of the IT system of interest and the comparison systems. For example, the generated text may include a time or date on which the report is generated or the number of systems to which the IT system of interest is being compared. The generated text may also include text generated from data that is related to the IT system of interest, the comparison systems or the statistical values calculated from the selected subset of data. For example, the generated text may include the name of an enterprise, whose IT system is the subject of the report, as shown at 900. A report component refers to a data item by the name of the data item, for example "<<EnterpriseName>>".

The second exemplary report component 804 of the report 800 is a table component, consisting of one or more rows and one or more columns. Cells of the table may be populated with predetermined or generated text, as discussed above with respect to the text component 802. For example, column headings may be predetermined text, and cell contents may be data items from the selected subset of data or values calculated from one or more such data items. FIG. 10 is a schematic diagram of two exemplary table report component templates, such as templates that may be used to generate the first and fourth report components 802 and 808 of the report 800 (FIG. 8). As shown in the exemplary table report component templates of FIG. 10, table cell contents may be specified by referring to data item names, such as "<<Srvr>>" and "<<BU_SW>>."

If the cell contents of a table are data items, the column headings may be automatically generated from the names of the data items. That is, the per-enterprise data 110 and the aggregated data 112 may include or have associated data dictionaries that include metadata, such as the names of the data items, the number of characters required to display the data, the format and precision of the data, etc.

Figure 11:
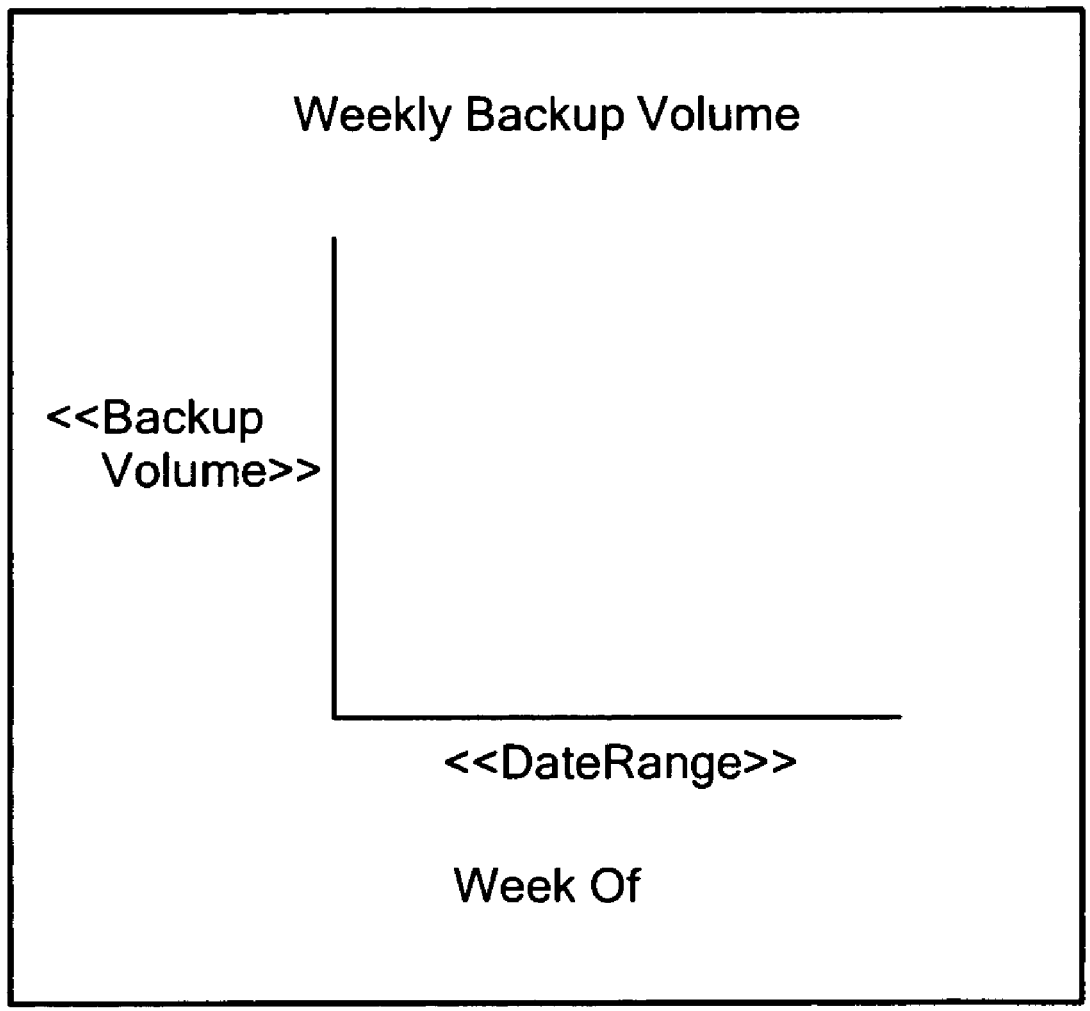
FIG. 11 is a schematic diagram of an exemplary graph report component template, according to one embodiment of the present invention.

The third exemplary report component 806 is a chart component, which may be a graph, bar chart, pie chart, scatter plot or the like, similar to a chart generated by a spreadsheet program from the selected subset of data, or a portion thereof. FIG. 11 is a schematic diagram of an exemplary graph report component template, such as a template that may be used to generate the third report component 806 of the report 800 (FIG. 8). The fourth exemplary report component 808 is another table component.

Figure 12:
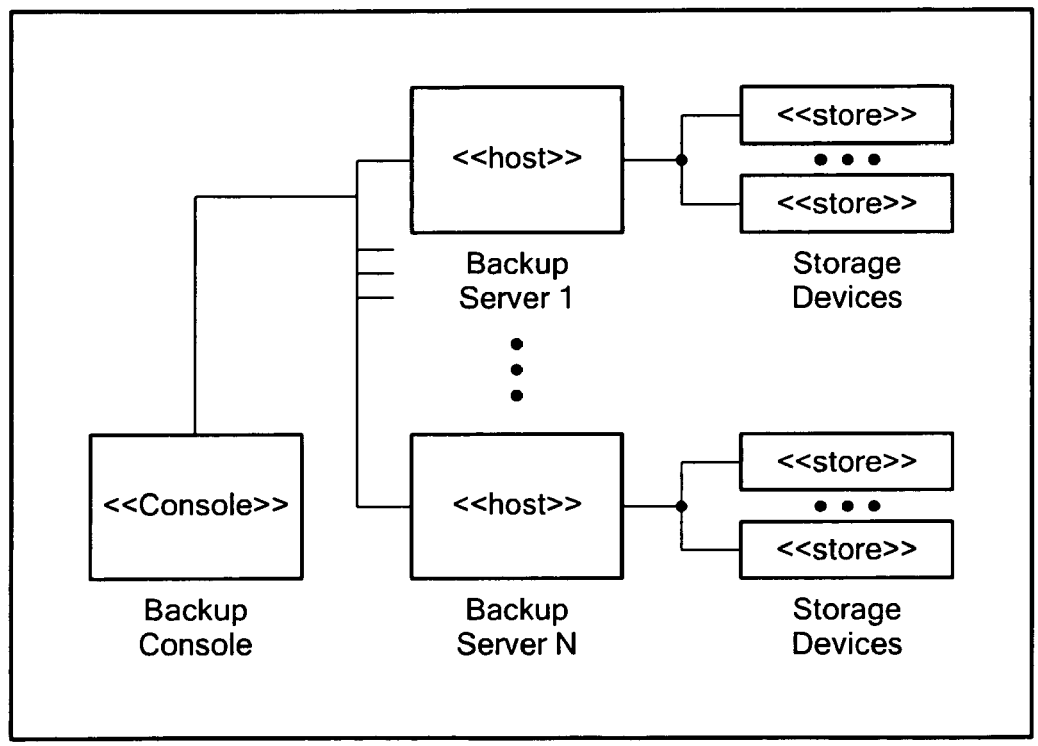
FIG. 12 is a schematic diagram of an exemplary block diagram report component template, according to one embodiment of the present invention.

Other types of components, including block diagrams and spreadsheets, may be included in the report 800, and these report components may include predetermined or generated text (as discussed above), as well as representations (such as graphs or block diagrams) that are generated from the selected subset of data or a portion thereof. FIG. 12 is a schematic diagram of an exemplary block diagram report component template. A report may include any combination of report components types, in any order, and a report may include several components of a single type.

Figure 13:
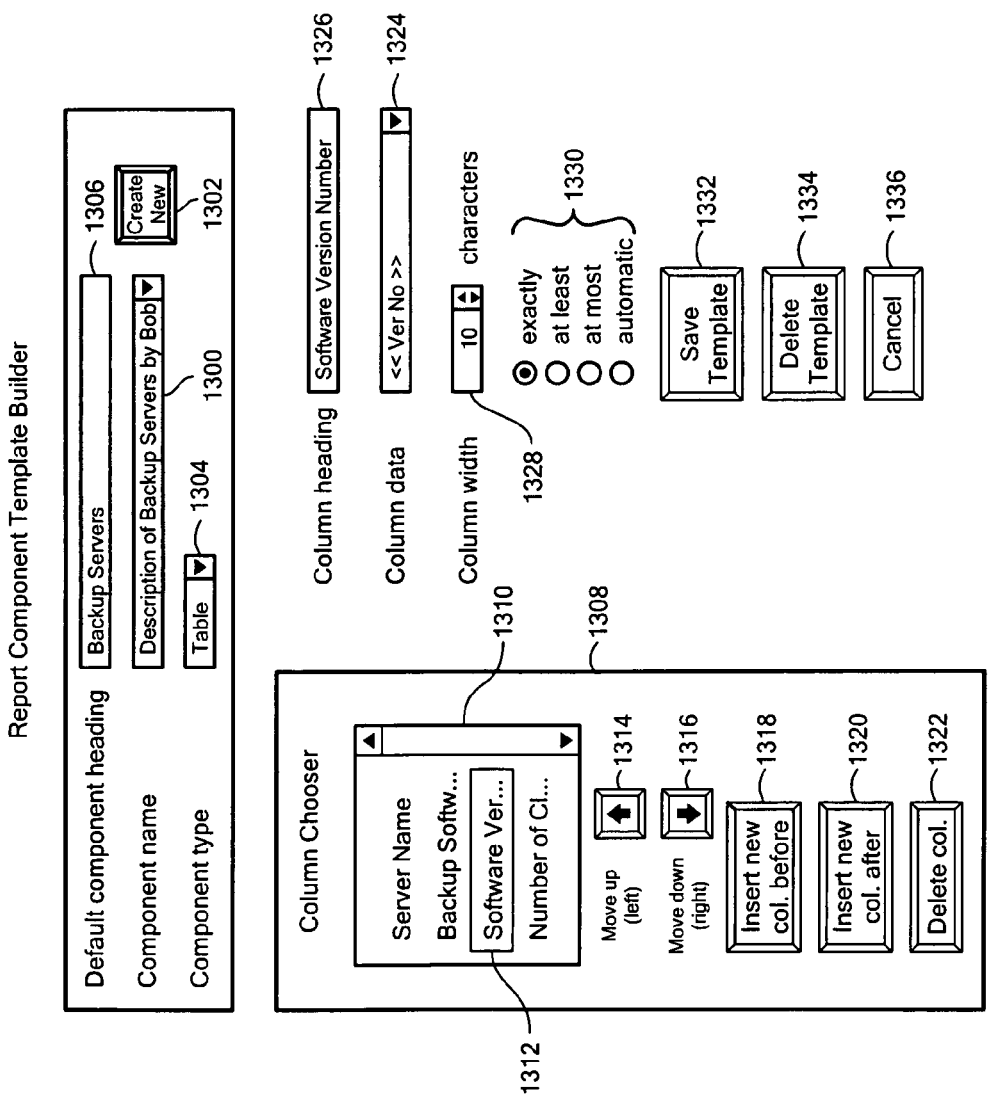
FIG. 13 a schematic diagram of a user interface for designing, modifying and deleting report component templates, according to one embodiment of the present invention.

Users may design, modify and delete report templates and report component templates, in a manner analogous to the way users may define, modify and delete user-supplied rules. In addition, predefined and user-submitted templates may be vetted and voted on, as described above with respect to user-submitted rules. FIG. 13 shows an exemplary user interface for designing, modifying and deleting report component templates. A user specifies a name for the report component template in a text/pull-down control 1300. If the user wishes to create a new report component template, the user invokes a "Create new" control 1302. Using a pull-down control 1304, the user specifies the type of the report component, such as a table, text, graph, block diagram, etc. Using a text box 1306, the user may specify a default heading to be displayed in a report that includes a report component generated according to this report component template. As discussed below, this heading may be overridden in the report template.

Portions of the remainder of the user interface depend on the type of the report component. The exemplary user interface of FIG. 13 is used to design a table report component template. For example, a "Column chooser" 1308 enables the user to select one column of the table at a time. In response, other aspects of the user interface display information about the selected column.

A scrolling list 1310 displays a list of the columns of the table. A user may select one of the columns by highlighting the column, as indicated at 1312. The user may reposition the column within the table by activating a "Move left" control 1314 or a "Move right" control 1316. The user may also insert a new column before (i.e., to the left of) or after (i.e., to the right of) the selected column with appropriate controls 1318 and 1320. The user may also delete the selected column from the report component template with a control 1322.

When a column is selected in the scrolling list 1310, information about the column is displayed in other portions of the user interface. For example, a pull-down list 1324 lists the data items that are available for inclusion in the table. The user may select or change the data item that is associated with the selected column 1312 by manipulating the pull-down list 1324. A text box 1326 displays a column heading. This column heading may default to a value associated (such as by the data dictionary) with the data item selected by the pull-down list 1324. The user may override or enter a value in the text box 1326. Similarly, the user may specify a column width for the selected column by manipulating a control 1328. The column width may be made to be automatic or specified exactly or as a minimum or as a maximum using another control 1330. The report component template may be saved or deleted, or the operation may be canceled, by activating an appropriate "Save," "Delete" or "Cancel" control 1332, 1334 or 1336.

As noted, the exemplary user interface of FIG. 13 is used to design a table report component template. Similar user interfaces are used to create, modify and delete report component templates for other types of components. The controls in these other user interfaces depend on the type of component being manipulated. For example, a user interface for a graph report component template enables a user to specify one or more data items that are to be plotted along various axes.

FIG. 20 shows an exemplary user interface for designing chart component templates.

In some cases, a report component designer may wish to include or exclude a report component or portions thereof, based on data item values, i.e., the designer may wish to define rules for including or excluding the report component in a report. FIG. 19 shows an alternative exemplary user interface for designing table component templates, which includes "filter" criteria 1900 that may be used to automatically determine whether to include or exclude the table component. Optionally, the user interface may include sort criteria 1902 for specifying an order in which data is to be included in a table generated according to the table component template.

Figure 14:
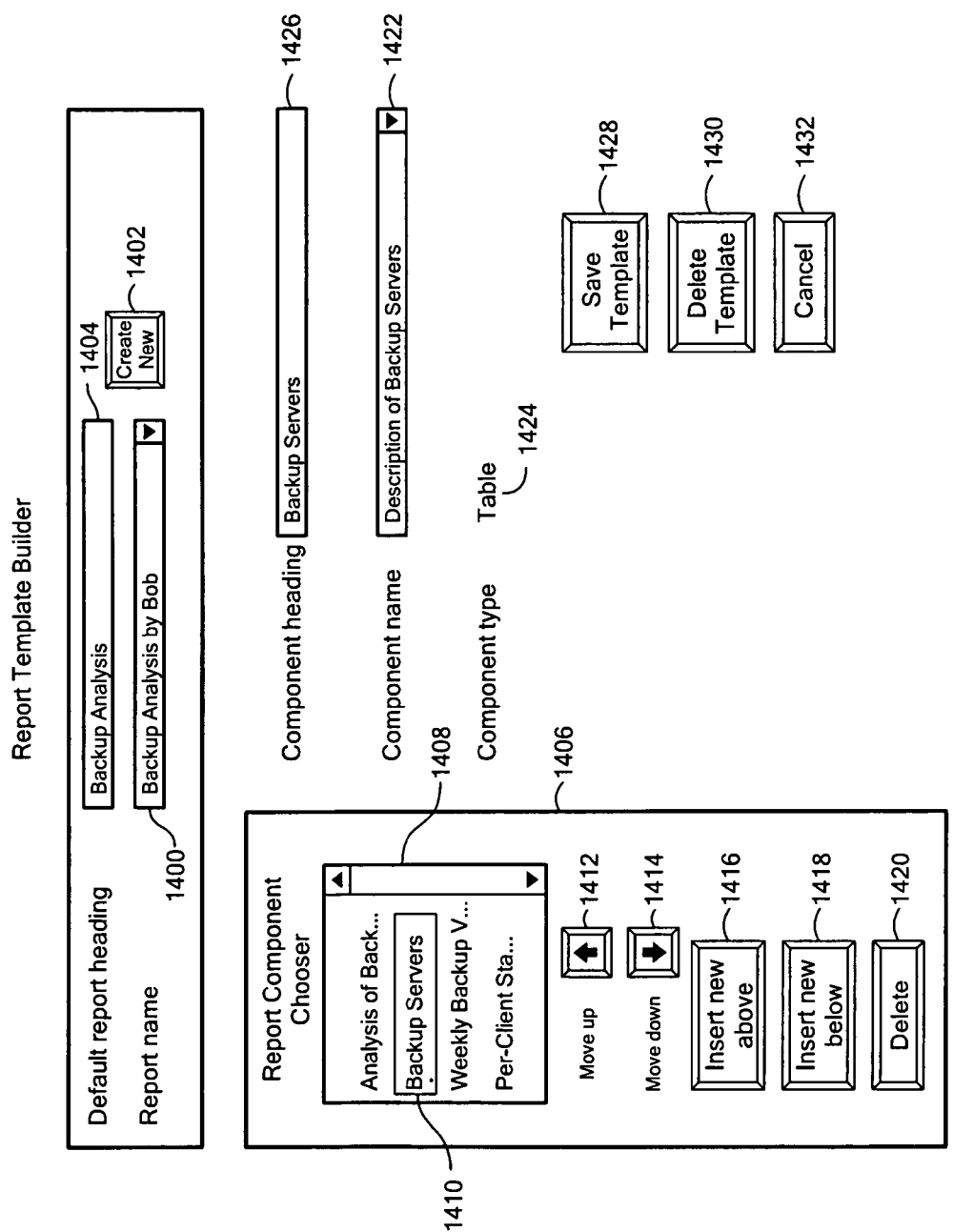
FIG. 14 a schematic diagram of a user interface for designing, modifying and deleting report templates.

FIG. 14 shows an exemplary user interface for designing, modifying and deleting report templates. A user specifies a name for the report template in a text/pull-down control 1400. If the user wishes to create a new report template, the user invokes a "Create new" control 1402. Using a text box 1404, the user may specify a default heading to be displayed in a report that is generated according to this report template.

A report template includes a set of report component templates in a specified order. A "Report component chooser" 1406 enables a user to select one report component of the report template (i.e., a position within the report template) at a time. A scrolling list 1408 displays a list of report components in the order in which the report components will appear in a report generated according to the report template. Elements of the list are represented by the headings that will appear at the beginning of the respective report components. A user may select one of the report components by highlighting the report component, as indicated at 1410. The user may reposition the report component within the report by activating a "Move up" control 1412 or a "Move down" control 1414. Alternatively, the user may "drag and drop" report components to reorder the report components within the scrolling list 1408. The user may also insert a new report component before (i.e., above) or after (i.e., below) the selected report component with appropriate controls 1416 and 1418. The user may also delete the selected report component from the report template with a control 1420.

When a report component is selected in the scrolling list 1408, information about the report component is displayed in other portions of the user interface. For example, a pull-down list 1422 lists the report component templates that are available for inclusion in the report template. When a report component is selected in the scrolling list 1408, the report component's name is displayed in the pull-down list 1422. The user may select or change the report component template that is associated with the selected position 1410 by manipulating the pull-down list 1422. A read-only text field 1424 displays the type of the report component template selected in the pull-down list 1422.

A text box 1426 displays a report component heading. This report component heading may be the default value associated with the report component selected by the pull-down list 1422. As discussed above, a default value for the report component heading may be defined when the report component template is created or modified. The user may enter a value in the text box 1426 to override the default or change the report component heading. The report template may be saved or deleted, or the operation may be canceled, by activating an appropriate "Save," "Delete" or "Cancel" control 1428, 1430 or 1432.

Figure 15:
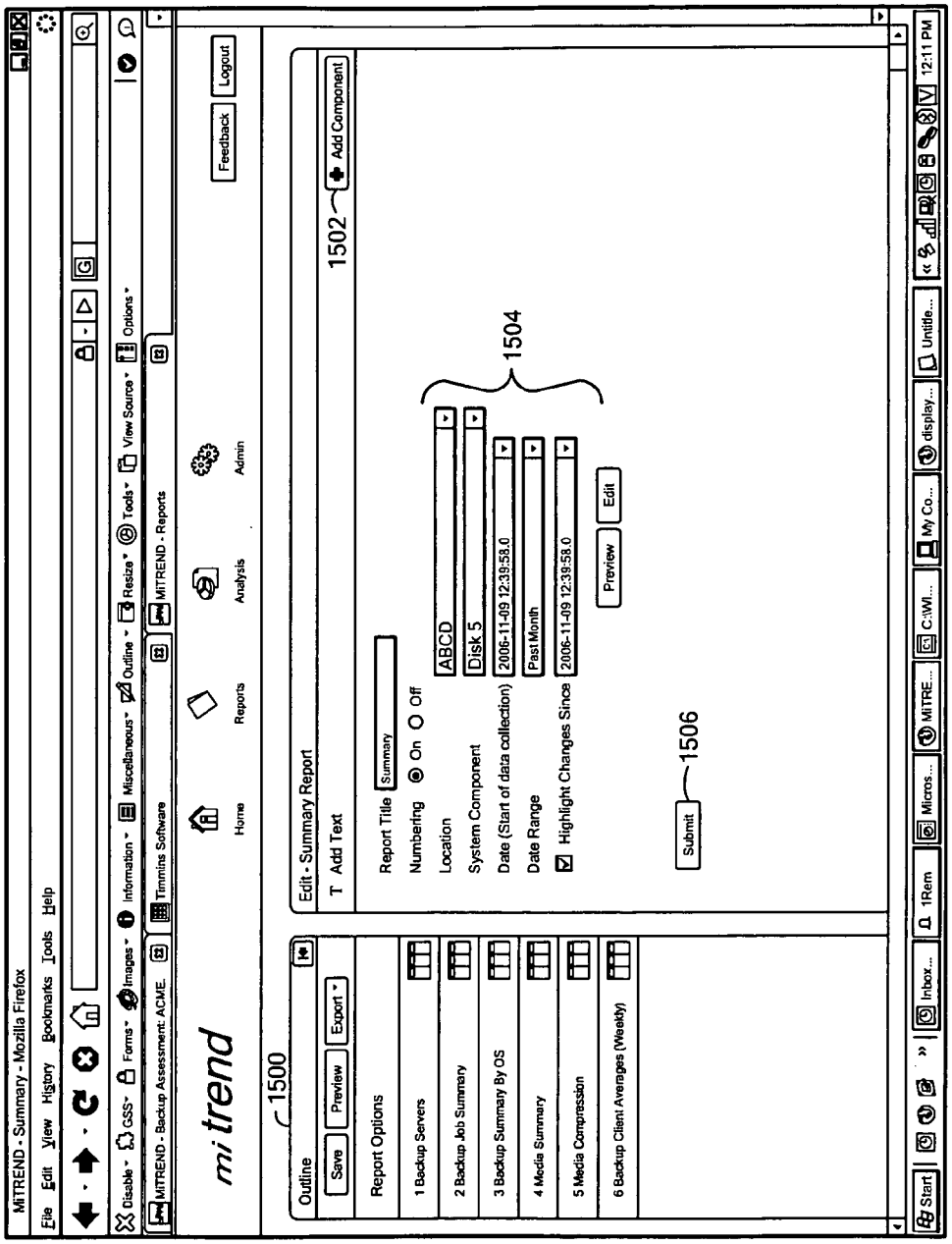
FIG. 15 is a schematic diagram of an alternative user interface for creating report templates, according to one embodiment of the present invention.

An alternative user interface for creating report templates is shown in FIG. 15. This and other user interfaces for creating report templates may also be used to generate reports, as discussed below. An outline 1500 lists report components included in a report template. A user may add a report component to the currently selected report template by activating an "Add Component" control 1502. Activating this control 1502 causes a second portion of the user interface, shown in FIG. 16, to be displayed. Using an "Add here" control 1600 (which may be repositioned before or after any report component in the outline 1500), the user may select where, within the report template, an additional report component is to be added. From a list 1602 of folders and subfolders of available report components, a user may select a folder or subfolder, such as indicated at 1604. A list 1606 of report components cataloged under the selected folder or subfolder 1604 is displayed, and the user may select one of these available report components, as indicated at 1608.

The user may command the system to display a preview of the selected report component 1608 by activating a "Preview" control 1610. Data selected according to controls 1504 (FIG. 15) may be used by the selected report component 1608 to generate the preview or a full report. Alternatively, "dummy" or representative data may be used to generate the preview or report. The user may add the selected report component 1608 to the report template by activating an "Add" control 1612.

Figure 16:
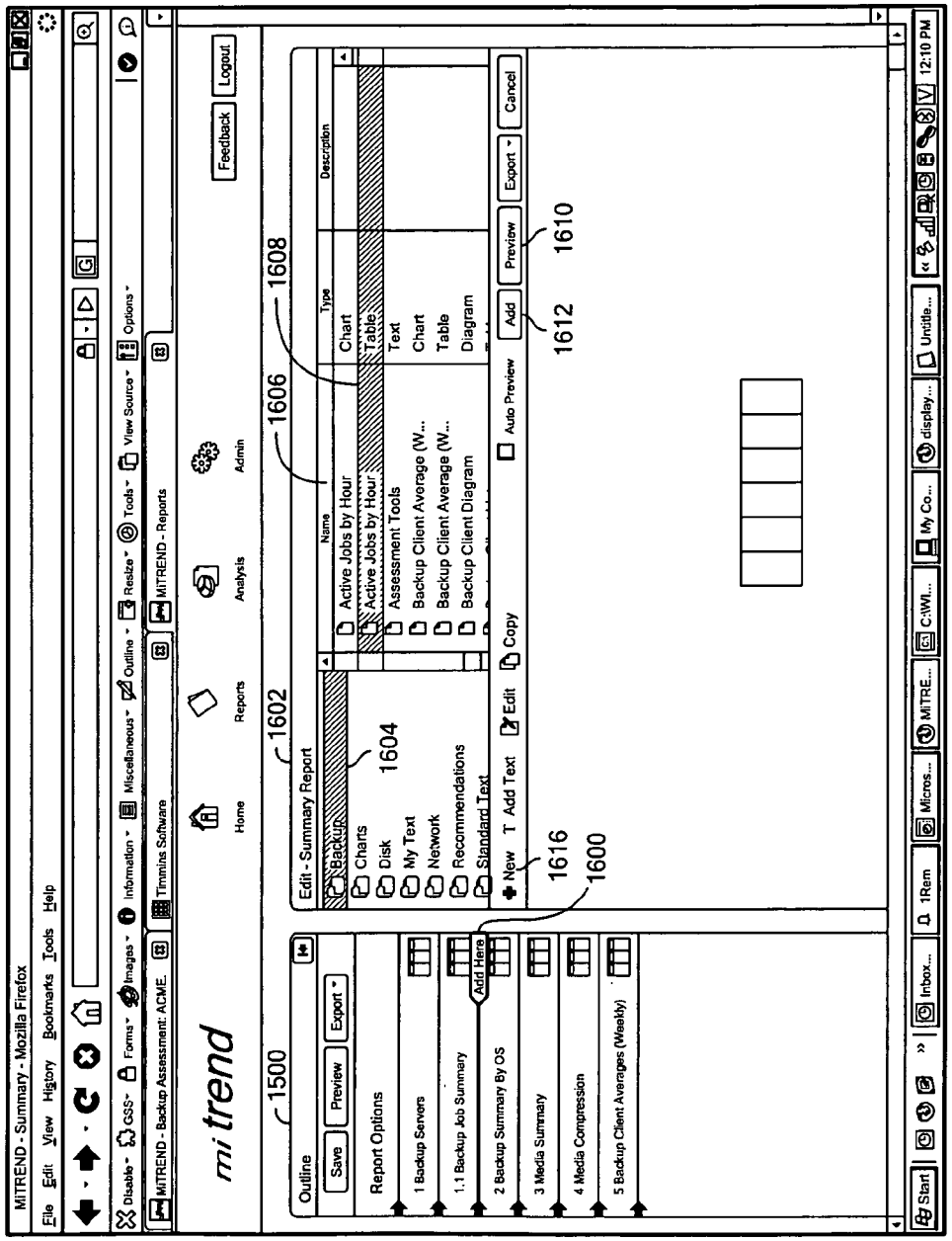
FIG. 16 is a schematic diagram of a second portion of the user interface of FIG. 15.
Figure 17:
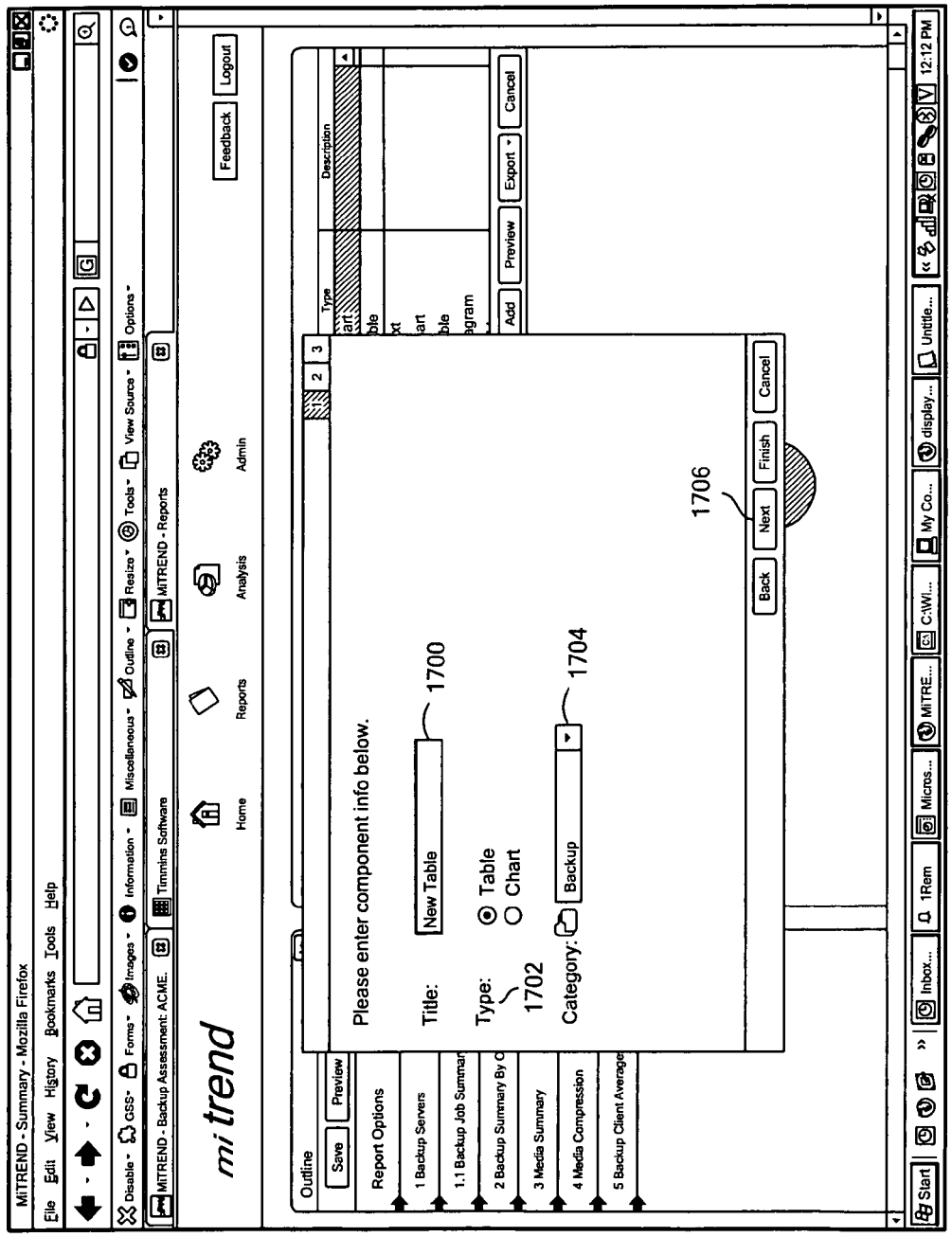
FIG. 17 is a schematic diagram of a first user interface for defining a report component, according to one embodiment of the present invention.
Figure 18:
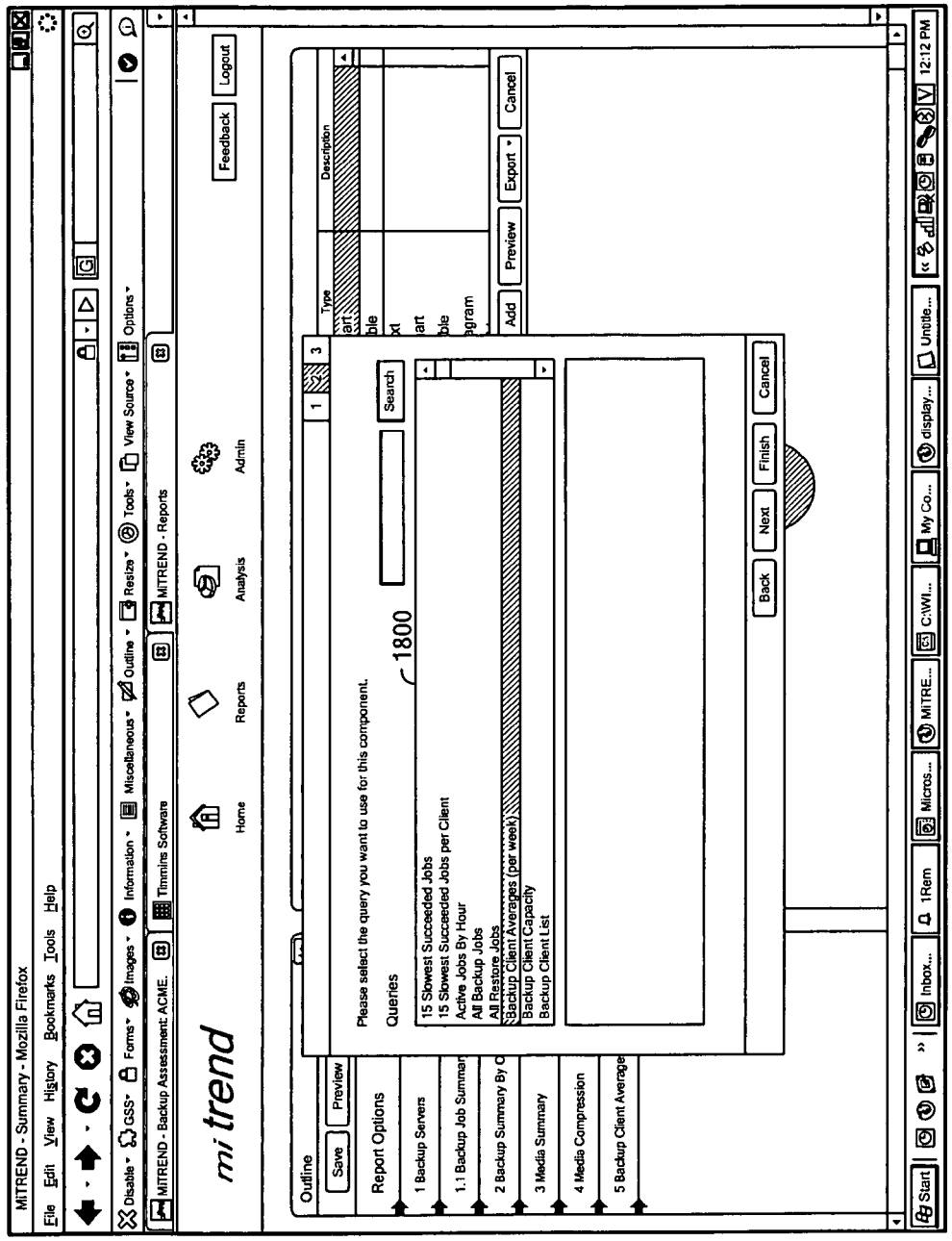
FIG. 18 is a schematic diagram of a second user interface for defining a report component, according to one embodiment of the present invention.

A user may define a new report component by activating a "New" control 1616. Doing so causes the system to display a series of user interfaces, each in a window, by which the user may define the new report component. An example of the first of these user interfaces is shown in FIG. 17. The user may give the report component a title 1700 and select a type 1702, such as table or chart. In addition, the user may categorize the new report component for inclusion in one of the folders or subfolders 1602 (FIG. 16). When the user is satisfied with the entries, he/she may activate a "Next" control 1706, which causes the system to display the second user interface, as shown in FIG. 18. The second user interface allows the user to select a query from a list 1800 of queries that may be applied to the data in the data warehouse or a per-enterprise data set. Data that satisfies the query is used to populate the resulting report component in a preview or report.

If the user commanded the system to create a table report component, i.e., the user selected "Table" with the control 1702 (FIG. 17), the system displays the table creation user interface shown in FIG. 19 (described above). On the other hand, if the user commanded the system to create a graph report component, the system displays the chart creation user interface shown in FIG. 20 (described above.)

A system for analyzing an information technology system of interest has been described. Such a system may include a processor controlled by instructions stored in a memory. The memory may be random access memory (RAM), read-only memory (ROM), flash memory or any other memory, or combination thereof, suitable for storing control software or other instructions and data. Some of the functions performed by the system have been described with reference to flowcharts and/or block diagrams. Those skilled in the art should readily appreciate that functions, operations, decisions, etc. of all or a portion of each block, or a combination of blocks, of the flowcharts or block diagrams can be implemented as computer program instructions, software, hardware, firmware or combinations thereof. Those skilled in the art should also readily appreciate that instructions or programs defining the functions of the present invention can be delivered to a processor in many forms, including, but not limited to, information permanently stored on non-writable, computer-readable storage media (e.g. read only memory devices within a computer, such as ROM, or devices readable by a computer I/O attachment, such as CD-ROM or DVD disks), information alterably stored on writable, computer-readable storage media (e.g. floppy disks, flash memories and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Moreover, while the embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A computer-implemented method for analyzing an information technology system of interest, the method comprising:
   for each of a plurality of information technology systems, automatically collecting identification information related to the information technology system and configuration data and performance data related to components of the information technology system, the configuration data, the performance data and the identification information being collected from the information technology system;
   replacing at least part of the collected identification information with a pseudonym to provide anonymity of the information technology system;
   selecting a subset of the collected data based on at least one user-entered criterion;
   calculating a statistical value from the selected subset;
   comparing the calculated statistical value to a value collected from the information technology system and associated with a component of the information technology system of interest; and
   displaying a result of the comparison.

2. A method as defined in claim 1, wherein selecting the subset of the collected data comprises selecting a subset of the plurality of information technology systems, based on at least one user-entered criterion.

3. A method as defined in claim 2, wherein:
   the at least one user-entered criterion, upon which the selection of the subset of the plurality of information technology systems is based, comprises a reference to performance data or configuration data related to the information technology system of interest; and
   selecting the subset of the plurality of information technology systems comprises selecting information technology systems from which was collected performance data or configuration data that is similar, within a predetermined limit, to the performance data or configuration data related to the information technology system of interest.

4. A method as defined in claim 1, further comprising:
   accepting the value associated with the component of interest as a user input.

5. A method as defined in claim 1, further comprising:
automatically collecting the value associated with the component of interest from the information technology system of interest.

6. A method as defined in claim 5, wherein automatically collecting the value comprises collecting the value from the information technology system of interest in response to a user request.

7. A method as defined in claim 1, wherein collecting the performance data comprises repeatedly collecting the performance data at spaced-apart points in time.

8. A method as defined in claim 1, further comprising:
sending the collected data from a plurality of information technology systems, via a wide-area network, to a central system; and
storing the collected data in a database associated with the central system.

9. A method as defined in claim 1, further comprising:
sending the collected data from a plurality of information technology systems, via a wide-area network, to a distributed system; and
storing the collected data in a database associated with the distributed system.

10. A method as defined in claim 1, wherein displaying the result comprises generating an indication if the value associated with the at least one component of interest differs from the calculated statistical value by more than a predetermined amount.

11. A method as defined in claim 1, further comprising:
accepting user-submitted rules for evaluating data items in the collected data; and
wherein comparing the calculated statistical value comprises comparing the calculated statistical value to the value associated with the component of the information technology system of interest according to a criterion specified by at least one of the user-submitted rules.

12. A method as defined in claim 11, further comprising assigning a score to each user-submitted rule.

13. A method as defined in claim 12, further comprising vetting the user-submitted rules according to the assigned scores.

14. A method as defined in claim 13, wherein assigning the score comprises accepting votes.

15. A method as defined in claim 11, further comprising vetting the user-submitted rules, including collecting opinions regarding ones of the user-submitted rules from a community of users.

16. A method as defined in claim 15, wherein vetting the user-submitted rules comprises accepting votes reflecting opinions regarding ones of the user-submitted rules.

17. A method as defined in claim 16, wherein vetting the user-submitted rules further comprises ranking the user-submitted rules based on the collected votes.

18. A method as defined in claim 11, wherein each user-submitted rule comprises:
a data identifier that identifies the values to be compared;
a condition that defines the comparison to be performed; and
a consequence that defines at least a portion of the result to be displayed.

19. A method as defined in claim 1,
further comprising
storing a copy of the pseudonym in association with the replaced at least part of the identification information.

20. A method as defined in claim 1, wherein replacing at least part of the collected identification information with the pseudonym comprises modifying Internet protocol (IP) addresses from the collected data.

21. A method as defined in claim 1, wherein replacing the at least part of the collected identification information with the pseudonym comprises modifying server names from the collected data.

22. A method as defined in claim 1, wherein replacing the at least part of the collected identification information with the pseudonym comprises modifying customer names from the collected data.

23. A method as defined in claim 1, wherein replacing the at least part of the collected identification information with the pseudonym comprises allowing a user to specify identification information to be modified in the collected data.

24. A method as defined in claim 1, further comprising aggregating the collected data in a database.

25. A method as defined in claim 24, further comprising removing identification information from the collected data prior to aggregating the data in the database.

26. A method as defined in claim 1, further comprising quantizing at least some of the collected data.

27. A system for analyzing an information technology system of interest, the system comprising:
a server configured to:
automatically receive, from each of a plurality of information technology systems, identification information related to the information technology system and configuration data and performance data related to components of the information technology system;
replace at least part of the collected identification information with a pseudonym to provide anonymity of the information technology system;
select a subset of the received data, based on at least one user-entered criterion;
calculate a statistical value from the selected subset;
compare the calculated statistical value to a value associated with a component of the information technology system of interest; and
display a result of the comparison.

28. A computer-implemented method for comparing an information technology system of interest to other, similar, information technology systems, the method comprising:
for each of a plurality of information technology systems, automatically collecting identification information related to the information technology system and configuration data and performance data related to components of the information technology system, the configuration data, the performance data and the identification data being collected from the information technology system;
replacing at least part of the collected identification information with a pseudonym to provide anonymity of the information technology system;
selecting, based on at least one user-entered similarity criterion, a subset of the information technology systems;
selecting, based on at least one user-entered data selection criterion, a subset of the data collected from the selected subset of information technology systems;
calculating a statistical value from the selected subset of the data;
comparing the calculated statistical value to a corresponding value associated with a component of the information technology system of interest; and
displaying a result of the comparison.

29. A method as defined in claim 28, wherein selecting the subset of the information technology systems comprises preventing selection of fewer than a predetermined number of information technology systems.

30. A computer-implemented method for analyzing an information technology system of interest, the method comprising:

for each of a plurality of information technology systems, automatically collecting identification information related to the information technology system and configuration data and performance data related to components of the information technology system, the configuration data, the performance data and the identification information being collected from the information technology system;

replacing at least part of the collected identification information with a pseudonym to provide anonymity of the information technology system;

identifying a plurality of groups of information technology systems represented by the collected data, each identified group consisting of information technology systems having at least one common characteristic;

selecting one of the groups, such that at least one of the characteristics of the selected group matches a corresponding characteristic of the information technology system of interest;

calculating a statistical value from the selected group;

comparing the calculated statistical value to a value associated with a component of the information technology system of interest; and displaying a result of the comparison.

31. A method as defined in claim 30, wherein identifying the plurality of groups of information technology systems comprises automatically identifying the plurality of groups.

32. A method as defined in claim 30, wherein identifying the plurality of groups of information technology systems comprises identifying the plurality of groups based on a user input.

33. A method as defined in claim 30, wherein selecting the one of the groups comprises selecting the group based on a user input.

34. A method as defined in claim 30, wherein selecting the one of the groups comprises:

automatically determining the characteristic of the information technology system of interest; and automatically selecting the group based on the characteristic of the information technology system.

35. A method as defined in claim 34, wherein automatically determining the characteristic comprises automatically determining the characteristic in response to a user command.

36. A computer-implemented method for analyzing an information technology system of interest, the method comprising:

for each of a plurality of information technology systems, automatically collecting identification information related to the information technology system and configuration data and performance data related to components of the information technology system, the configuration data, the performance data and the identification information being collected from the information technology system;

replacing at least part of the collected identification information with a pseudonym to provide anonymity of the information technology system;

automatically identifying a plurality of groups of information technology systems represented by the collected data, each identified group consisting of information technology systems having at least one common group characteristic;

selecting one of the plurality of groups, such that at least one of the characteristics of the selected group matches a corresponding characteristic of the information technology system of interest;

selecting a set of analysis rules based on the selected group;

analyzing a value associated with the component of interest according to at least one of the selected set of analysis rules; and displaying a result of the analysis.

37. A computer-implemented method for analyzing a component of interest of an information technology system, the method comprising:

replacing at least part of collected identification information, related to the information technology system, with a pseudonym to provide anonymity of the information technology system;

accepting user-submitted rules from a community of users, each rule comprising at least one value and an associated criterion;

comparing a value, the value comprising at least one of a value of configuration data automatically collected from the information technology system and a value of performance data automatically collected from the information technology system, associated with the component of interest to the values of at least some of the user-submitted rules according to the criteria associated with the respective rules;

if, as a result of the comparison, the value associated with the component of interest meets the criterion of a rule, displaying a message.

38. A computer-implemented method for analyzing an information technology system, the method comprising:

collecting identification information related to the information technology system and configuration data and performance data related to components of the information technology system, the configuration data, the performance data and the identification information being collected from the information technology system;

replacing at least part of the collected identification information with a pseudonym to provide anonymity of the information technology system;

selecting a subset of the collected data;

calculating a statistical value from the selected subset;

comparing the calculated statistical value to a selected value associated with a component of the information technology system; and displaying a result of the comparison.

39. A method as defined in claim 38, wherein the subset of the collected data is selected based on at least one user-entered criterion.

40. A method as defined in claim 38, wherein selecting the subset of the collected data comprises selecting a subset that represents a first time period, the first time period being prior to a time period represented by the selected value associated with the component of the information technology system; whereby the selected value associated with the component of the information technology system is compared to historical data related to at least one component of the information technology system.

41. A method as defined in claim 38, wherein the calculated statistical value is compared to the value associated with the component of the information technology system according to a predetermined criterion.

42. A method as defined in claim 41, wherein the criterion specifies the first time period.

43. A method as defined in claim 41, further comprising:
accepting user-submitted rules from a community of users; and
wherein the criterion is defined by one of the user-submitted rules.

44. A method as defined in claim 43, wherein the criterion specifies the first time period.

45. A computer-implemented method for producing a report related to an information technology system, the method comprising:
collecting identification information related to the information technology system and configuration data and performance data related to components of the information technology system, the configuration data, the performance data and the identification information being collected from the information technology system;
replacing at least part of the collected identification information with a pseudonym to provide anonymity of the information technology system;
accepting user-submitted report component templates, each report component template specifying at least one data item, selected from the configuration data and the performance data, that is to be included in a report component and a format in which the data item is to be included;
accepting user-submitted report templates, each report template specifying a set of report components that are to be included in a report and a layout of the report components;
selecting a subset of the collected data; and
generating a report of the selected subset of the collected data according to a selected report template.

46. A method as defined in claim 45, wherein the format in which the data item is to be included comprises a graph.

47. A method as defined in claim 45, wherein the format in which the data item is to be included comprises a chart.

48. A method as defined in claim 45, wherein the format in which the data item is to be included comprises a table.

49. A method as defined in claim 45, wherein the format in which the data item is to be included comprises text.

50. A method as defined in claim 45, wherein the format in which the data item is to be included comprises a block diagram.

51. A method as defined in claim 45, wherein accepting a user-submitted report component template comprises:
displaying a list of data items available for inclusion in the report component;
accepting a user input that identifies at least one of the data items; and
including an identification of the identified data item in the report template.

52. A method as defined in claim 45, wherein accepting a user-submitted report template comprises:
displaying a list of available report component templates;
accepting a user input that identifies at least one of the displayed list of available report component templates; and
including an identification of the identified report component template in the report template.

53. A computer program product for use on a computer system for analyzing an information technology system of interest, comprising:
a tangible computer-readable medium on which are stored computer instructions such that, when the instructions are executed by a processor, the instructions cause the processor to:
receive, from each of a plurality of information technology systems, identification information related to the information technology system and configuration data and performance data related to components of the information technology system;
replace at least part of the collected identification information with a pseudonym to provide anonymity of the information technology system;
select a subset of the received data, based on at least one user-entered criterion;
calculate a statistical value from the selected subset;
compare the calculated statistical value to a value associated with a component of the information technology system of interest; and
display a result of the comparison.

\* \* \* \* \*